(12) United States Patent
Grefen

(10) Patent No.: US 11,562,113 B2
(45) Date of Patent: Jan. 24, 2023

(54) PROCESS CONTROL WITH DIGITAL TWINS

(71) Applicant: ASCon Systems Holding GmbH, Stuttgart (DE)

(72) Inventor: Kilian Grefen, Stuttgart (DE)

(73) Assignee: ASCon Systems Holding GmbH, Stuttgart (DE)

( * ) Notice: Subject to any disclaimer, the term of this patent is extended or adjusted under 35 U.S.C. 154(b) by 283 days.

(21) Appl. No.: 16/849,892

(22) Filed: Apr. 15, 2020

(65) Prior Publication Data

US 2020/0334402 A1      Oct. 22, 2020

(30) Foreign Application Priority Data

Apr. 18, 2019   (EP) ...................... 19170105

(51) Int. Cl.
*G06F 30/20*     (2020.01)
*G06F 9/448*     (2018.01)
*G06F 111/02*    (2020.01)

(52) U.S. Cl.
CPC ............ *G06F 30/20* (2020.01); *G06F 9/4498* (2018.02); *G06F 2111/02* (2020.01)

(58) Field of Classification Search
CPC ..... G06F 30/20; G06F 9/4498; G06F 2111/02
See application file for complete search history.

(56) References Cited

U.S. PATENT DOCUMENTS

| 2013/0204602 A1 | 8/2013 | Kim et al. |
| 2015/0006122 A1 | 1/2015 | Du |
| 2016/0247129 A1 | 8/2016 | Song et al. |
| 2018/0039249 A1 | 2/2018 | Johnson et al. |
| 2020/0334401 A1 | 10/2020 | Grefen |

OTHER PUBLICATIONS de Lara J, Guerra E, Boronat A, Heckel R, Torrini P. Domain-specific discrete event modelling and simulation using graph transformation. Software & Systems Modeling. Feb. 2014;13(1):209-38. (Year: 2014).*

Graf P, Muller-Glaser KD. Dynamic mapping of runtime information models for debugging embedded software. InSeventeenth IEEE International Workshop on Rapid System Prototyping (RSP'06) Jun. 14, 2006 (pp. 3-9). IEEE. (Year: 2006).*

(Continued)

*Primary Examiner* — Chuen-Meei Gan
(74) *Attorney, Agent, or Firm* — Wolf, Greenfield & Sacks, P.C.

(57) ABSTRACT

Real time process control using digital twins. In more detail, the present disclosure relates to the field of modeling distributed event-discrete systems using digital twins and subsequent use of the models for real time control of distributed even-discrete systems. There is provided a virtual twin engine for control of a distributed even-discrete system in real-time. The virtual twin engine has installed at least one executable modeling software kernel which runs subsystem use models in relation to subsystem clusters of the distributed event-discrete system. Also, the virtual twin engine operates the at least one digital twin in a passive manner through real time access to the modeling software kernel modeling the subsystem use model of the at least one digital twin.

21 Claims, 22 Drawing Sheets

(56) References Cited

OTHER PUBLICATIONS

Reichmann C, Gebauer D, Müller-Glaser KD. Model level coupling of heterogeneous embedded systems. InProc. 2nd RTAS Workshop on Model-Driven Embedded Systems May 2004. (Year: 2004).*
Schroeder GN, Steinmetz C, Pereira CE, Espindola DB. Digital twin data modeling with automationml and a communication methodology for data exchange. IFAC-PapersOnLine. Jan. 1, 2016;49(30):12-7. (Year: 2016).*
Extended European Search Report for European Application No. 19170105.1, dated Oct. 14, 2019.
Extended European Search Report for European Application No. 19170106.9 dated Oct. 17, 2019.
U.S. Appl. No. 16/849,765, filed Apr. 15, 2020, Grefen
U.S. Appl. No. 17/882,074, filed Aug. 5, 2022, Grefen.
EP19170106.9, Oct. 17, 2019, Extended European Search Report.

* cited by examiner

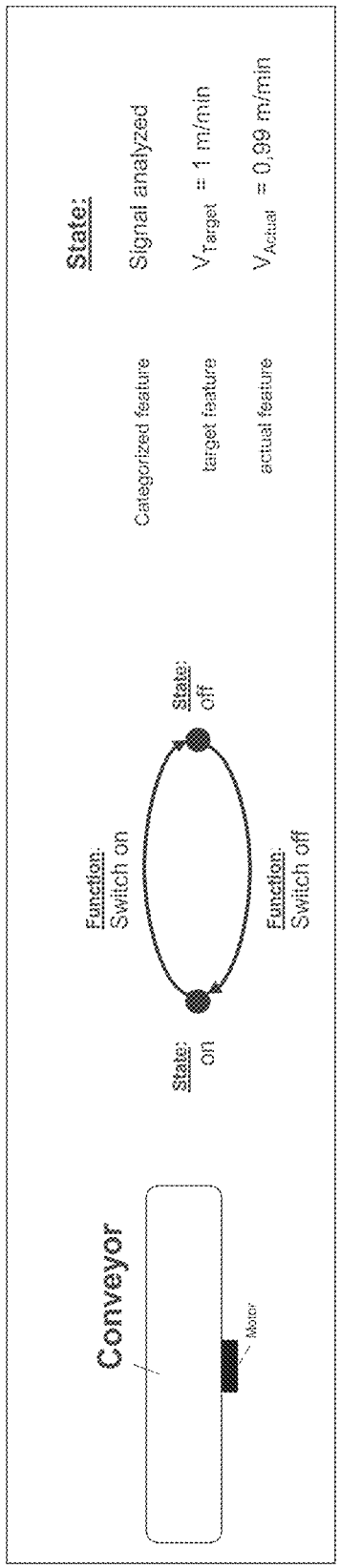
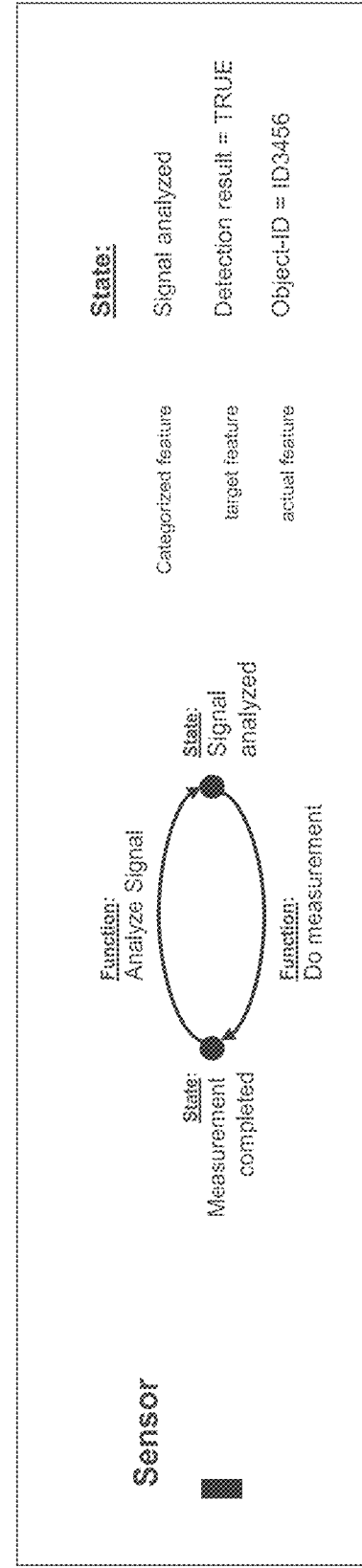
FIG. 3

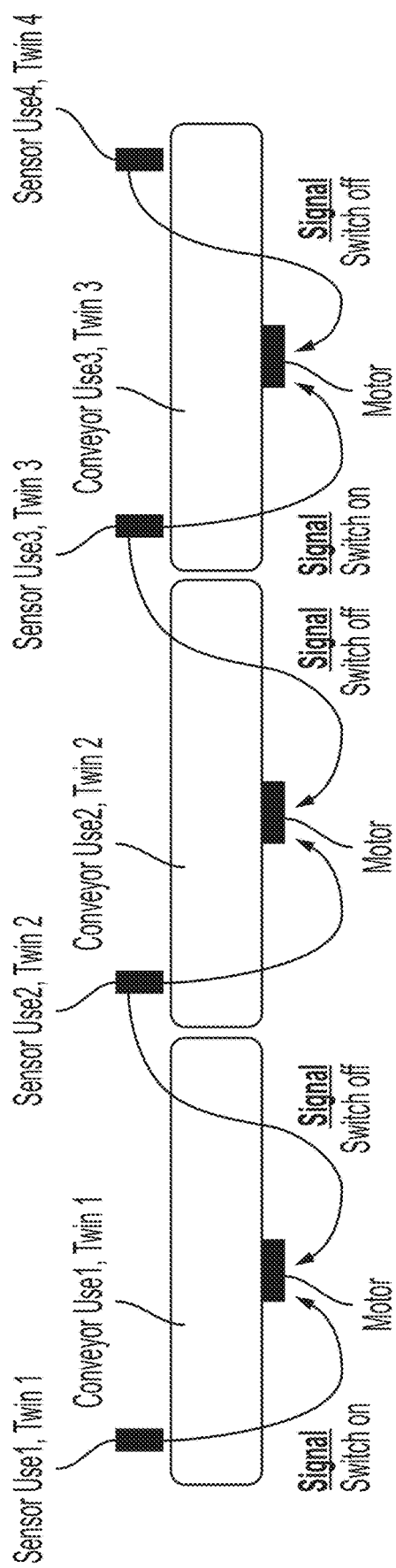
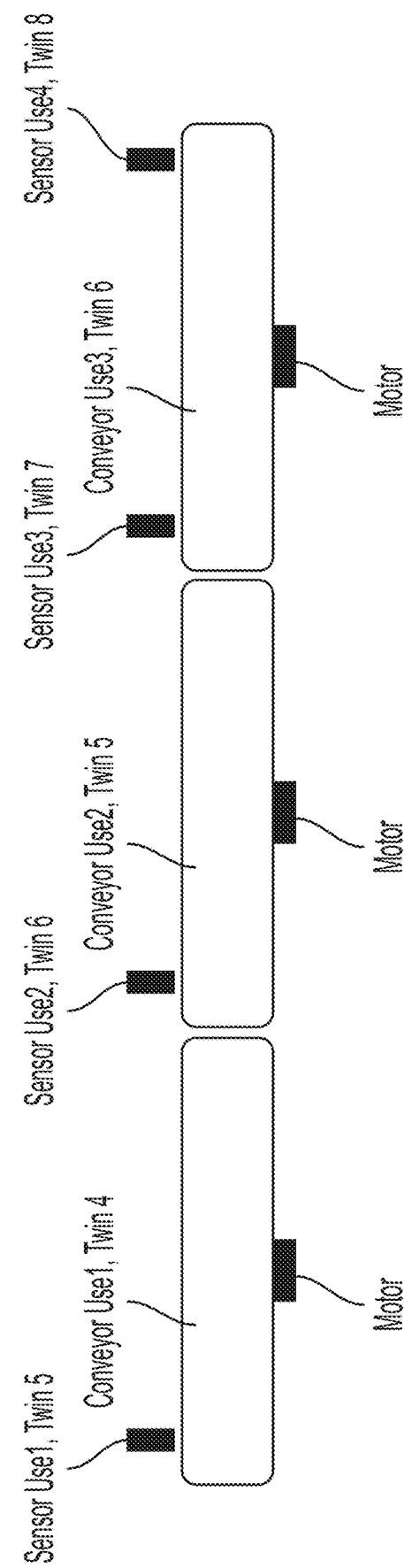
FIG. 5

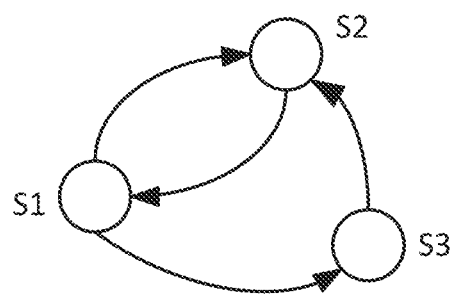

Twin Contexts

Twin 1: Twin 1 – Twin n = $C_{1n}$
... ...
Twin i – Twin j = $C_{ij}$
... ... ...
Twin n: Twin n – Twin k = $C_{nk}$

|  | $C_{1n}$ | $C_{ij}$ | $C_{nk}$ |
|---|---|---|---|
| Use 1-S1 | Twin 1 | Twin 1 | Twin 1 |
| Use 2-S2 | Twin 1 | Twin 1 | Twin 1 |
| Use 3-S3 | Twin 1 | Twin 1 | Twin 1 |
| Use 4-S1 | Twin 2 | Twin 2 | Twin 2 |
| Use 5-S2 | Twin 2 | Twin 2 | Twin 2 |
| Use 6-S3 | Twin 2 | Twin 2 | Twin 2 |
| Use 7-S1 | Twin 3 | Twin 3 | Twin 3 |
| Use 8-S2 | Twin 3 | Twin 3 | Twin 3 |
| ... | ... | ... | ... |
| Use n | Twin n | Twin n | Twin n |

$C_{ij}$
$\begin{bmatrix} ... \\ \text{Twin i / Sm} \\ ... \\ \text{Twin j / SM} \\ ... \end{bmatrix} = \begin{bmatrix} \text{Use i / } C_{ij} \\ \text{Use j / } C_{ij} \end{bmatrix}$

FIG. 22

PROCESS CONTROL WITH DIGITAL TWINS

CROSS REFERENCE OF RELATED APPLICATION

This application claims priority to European application number 19170105.1, filed Apr. 18, 2019. The contents of this application is incorporated herein by reference in its entirety.

FIELD OF INVENTION

The present invention relates to the field of real time process control using digital twins. In more detail, the present invention relates to the field of modeling distributed event-discrete systems using digital twins and subsequent use of the models for real time control of distributed even-discrete systems.

BACKGROUND ART

Real time process control in manufacturing is an ongoing challenge and subject to continuous development. FIG. 1 shows a typically example of a manufacturing environment subject to real-time process control.

As shown in FIG. 1, the considered manufacturing environment may, e.g., comprise a first line 1. The first line 1 may be setup from three conveyers, i.e. conveyer 11, conveyer 12, and conveyer 13, each provided with a sensor 11, 12, and 13, respectively.

As shown in FIG. 1, the considered manufacturing environment may, e.g., also comprise a second line 2. The second line 2 may be setup from three conveyers, i.e. conveyer 21, conveyer 22, and conveyer 23, each provided with a sensor 21, 22, and 23, respectively.

As shown in FIG. 1, the conveyer 11 of line 1 carries a box and the overall object of the process control could be a safe movement of the box along the line 1.

FIG. 2 shows a hierarchical tree model which is a typical model used for the process control of the manufacturing environment shown in FIG. 1.

As shown in FIG. 2, in the hierarchical tree model different subsystems of the process environment are represented as nodes. Typically, the hierarchical tree model is prepared prior to start of process control. The assignment of a subsystem to a hierarchy level in the hierarchical tree model may be application specific and different layers in the hierarchical tree model are usually operated in independent manner.

Further, there is no option to modify the generated hierarchical tree model once the process control starts as subsystems of the manufacturing environment are hard coded into the hierarchical tree model without flexibility. Should, e.g., a new line be set up for the manufacturing environment or should the application thereof change then this would require a complete recoding of the hierarchical tree model underlying the process control. Also a change in functionality of the different subsystems would necessitate a remodeling process for the hierarchical tree model.

However, in view of increasing complexity of process environments the existing approaches to process control no longer meet requirements for future application scenarios.

SUMMARY OF INVENTION

In view of the above, the object of the present invention is to increase flexibility in the modeling of distributed event discrete systems for subsequent efficient real time process control thereof.

According to a first aspect of the present invention this object is achieved by a method of running a virtual twin engine for control of a distributed even-discrete system in real-time, wherein the virtual twin engine has installed at least one executable modeling software kernel.

According to the first aspect of the present invention the at least one executable modeling software kernel is prepared by generating a meta model representation for at least one subsystem of a distributed event-discrete system by selecting from a meta model a meta object type referencing at least one state model for modeling of the at least one subsystem of the distributed event-discrete system, wherein at least one state in the selected at least one state model is described with a meta model being a set of partial states using different levels of data abstraction according to set of meta features characterizing a state in a meta description domain, a set of target features having discrete or continuous range of values characterizing a target for a considered state, and a set of actual features having discrete or continuous range of values characterizing an actual constellation of a considered state.

Further, according to the first aspect of the present invention the at least one executable modeling software kernel is prepared by partitioning the distributed event-discrete system into at least two subsystem clusters each comprising at least one subsystem of the distributed event-discrete system having a same meta model representation and by defining a routing topology for the exchange of streaming messages between subsystem clusters.

Further, according to the first aspect of the present invention the at least one executable modeling software kernel is prepared by modeling at least one subsystem use cluster for at least one subsystem assigned to a subsystem cluster of the distributed event-discrete system and by configuring the at least one executable modeling software kernel to run the routing topology and at least one subsystem use model in relation to every subsystem use of the subsystem cluster through parametrization of executable software available from a software library.

Further, according to the first aspect of the present invention the method of running the virtual twin engine comprises a step of running in real time at least one subsystem use model in relation to the subsystem cluster through execution of a related modeling software kernel modeling the at least one subsystem use model and a step of operating at least one digital twin with respect to the at least one subsystem use model as virtual counterpart to a related process object operated in the distributed even-discrete system and having a functionality in line with the subsystem use model.

Further, according to the first aspect of the present invention the step of operating the at least one digital twin is executed in a passive manner through real time access to the modeling software kernel modeling the subsystem use model of the at least one digital twin.

According to a second aspect of the present invention the object outlined above object is achieved by a virtual twin engine for control of a distributed even-discrete system in real-time, wherein the virtual twin engine has installed at least one executable modeling software kernel.

According to the second aspect of the present invention the at least one executable modeling software kernel is prepared as in the first aspect of the present invention.

According to the second aspect of the present invention the virtual twin engine comprises a model processing module adapted to run in real time at least one subsystem use model in relation to the subsystem cluster through execution of a related modeling software kernel modeling the at least one subsystem use model; wherein According to the second aspect of the present invention the model processing module is adapted to operate at least one digital twin with respect to the at least one subsystem use model as virtual counterpart to a related process object operated in the distributed even-discrete system and having a functionality in line with the subsystem use model; and According to the second aspect of the present invention the model processing module is adapted to operate the at least one digital twin in a passive manner through real time access to the modeling software kernel modeling the subsystem use model of the at least one digital twin.

BRIEF DESCRIPTION OF DRAWING

In the following the present invention and related examples will be explained with reference to the drawing in which:

FIG. 3 shows examples of modeling on a meta model layer using meta objects as types of meta models of subsystems;

FIG. 5 shows examples of modeling on a twin layer to describe subsystems as instances of clusters of meta models of subsystems;

FIG. 22 shows an example of a seed-box approach to an evaluation of state vectors and condition vectors in the data flow processing module according to the present invention as shown in FIG. 17;

DETAILED DESCRIPTION OF INVENTION

Figure 1:
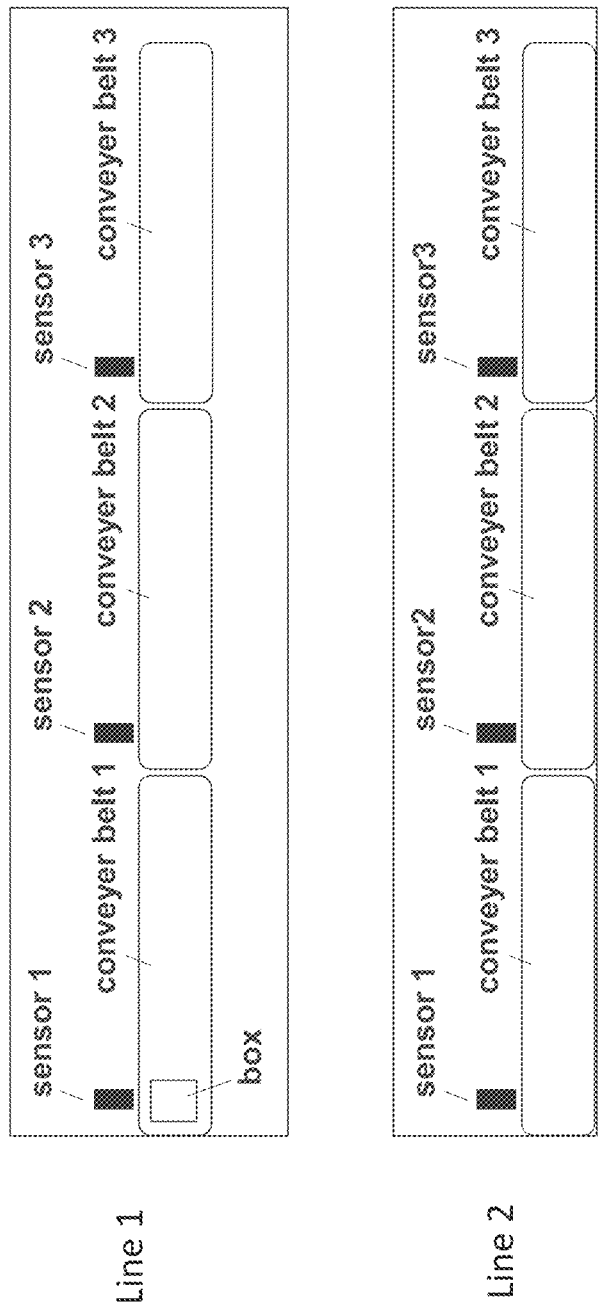
FIG. 1 shows a typically example of a manufacturing environment subject to real-time process control.
Figure 2:
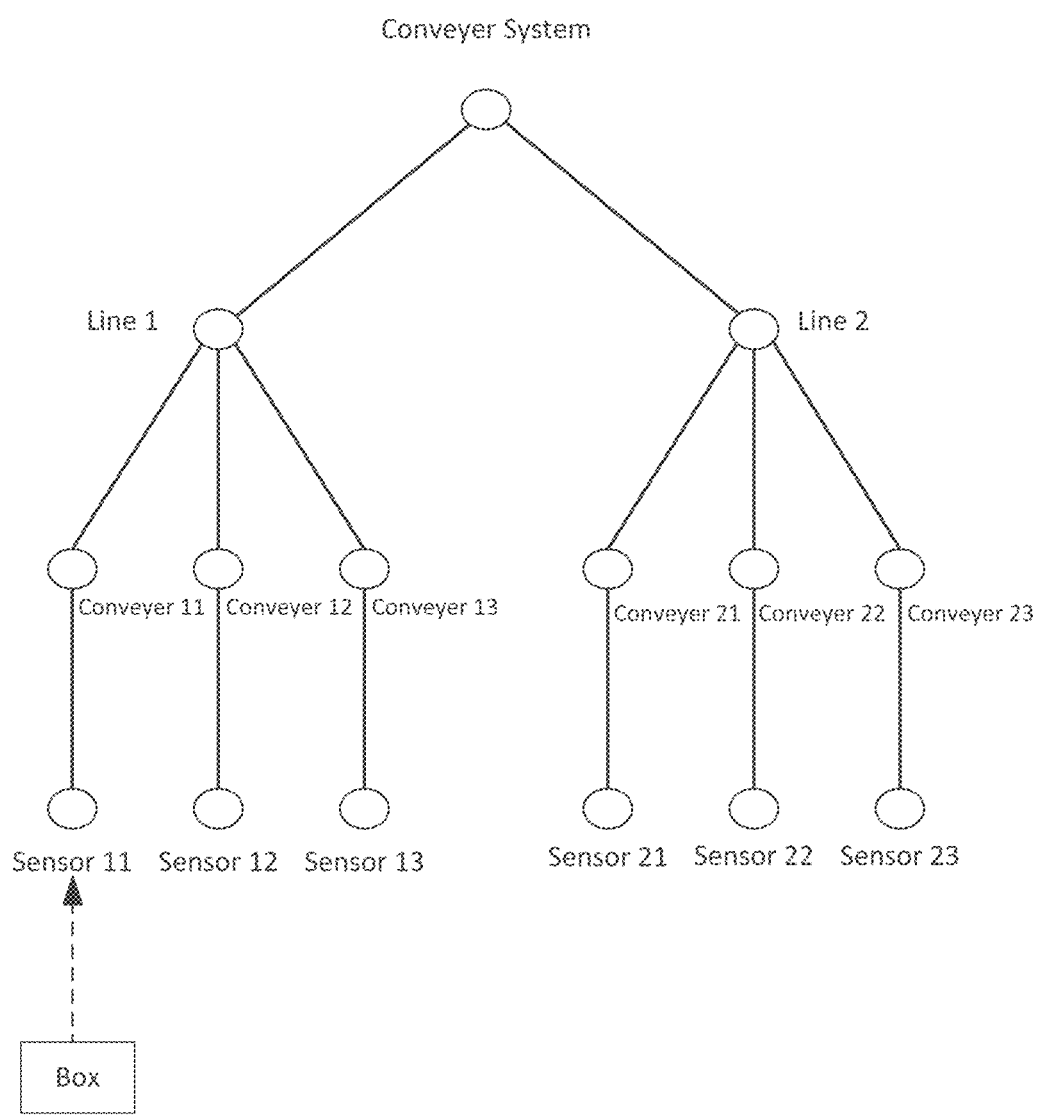
FIG. 2 shows an outline of a typical model underlying process control of the manufacturing environment shown in FIG. 1.

In the following, the present invention will be explained in detail with reference to the drawings. Here, it should be understood that such explanation is related to examples of the present invention only and not binding to the scope of the present invention as defined by the claims.

As far as reference is made to specific procedural or structural components, this is to be considered as example for the underlying functionality, where the procedural or structural components are clearly exchangeable as long as the same functionality is achieved. Thus, the present invention will be explained using generic terminology to avoid restriction of the scope of protection.

Further, the functionality of the process control using digital twins according to the present invention is manifold. It not only supports a flexible modeling of distributed event-discrete systems but also a real time process control of the distributed event-discrete systems.

Generally, a distributed event-discrete system to be considered within the overall framework of the present invention divides into a plurality of subsystems where each single subsystem operates autonomously and does not always have a complete picture on the overall operative states in the distributed event-discrete system.

Further, a distributed event-discrete system may categorize, e.g., into a continuous system, a discrete system deterministic system, stochastic system, dynamic system, real valued system, causal system, linear system, non-linear system, time invariant system, time variant system, stable system, BIBO stable system, loss free system, etc. or any suitable combination thereof.

Further, the term process in a subsystem of the distributed event-discrete system describes a sequence of events with a mutually fixed causal time relationship. This implies the causal distinguishability of events within subsystems of the distributed event-discrete system: two different local events in a subsystem should never occur at the same point in time.

In view of the above, events are classified into three classes:

A first class relates to internal events occurring within a subsystem of the distributed event-discrete system without external transmission of messages.

A second class relates to sending events occurring within a subsystem triggering the sending of messages from the subsystem to different subsystems of the distributed event-discrete system. From a global perspective they precede corresponding receiving events in different subsystems to which the messages are addressed.

A third class relates to receiving events occurring within subsystems upon receipt of messages from different subsystems of the distributed event-discrete system. From a global perspective they succeed corresponding sending events in different subsystems from which the messages are sent.

Generally, the modeling of distributed event-discrete systems is based upon a tradeoff between handling of a predetermined task and related efforts versus implied complexity of the overall model. In particular, the way of set up of particular partial systems for the model and the related connection contributes to the model complexity.

Here, in the state of the art, a typical approach is a hierarchical structuring and decomposition for a specific modelling task. Generally, in the state of the art, subsystems are modeled in a compositional manner, i.e. in a any-to-any approach. While the compositional structuring of the model increases the adaptability of the model according to new modeling goals, it increases the complexity of the model, in particular due to the high number of signaling connections between the subsystems.

Contrary to the prior art, the modeling approach according to the present invention supports modeling and process control of a distributed event-discrete system aligned for a dynamic modification of the overall system model in real-time.

As will be shown in the following, heretofore the present invention uses different levels of abstraction and modeling of the distributed event-discrete system, i.e. a meta level, a use level, and a twin level allowing for a partitioning of the overall distributed event-discrete system into partial systems which then are further specified topped down according to a virtual hierarchy or specifications.

FIG. 3 shows examples of modeling on a meta model layer using meta objects as types of meta models of subsystems.

As shown in FIG. 3, meta models use transformation functions or equivalently a language range, semantics describing meta states, and state space models describing a logical behavior.

Generally, the meta model highlights properties of an actual model. Thus, meta modeling is a construction of concepts within a certain application domain. Meta modeling typically involves studying input and output relationships and fitting of meta models to represent a given behavior.

Further, the relation between the digital twin level and the metal model level is of an instance-of-relation type. Also, the relation between the use level and the meta model is of an instance-of-relation type.

As shown in FIG. 3, meta modeling implies the abstraction away from specific real world instantiations on the basis of meta objects. For the particular example shown in FIG. 3, the meta objects are a meta object conveyer and a meta object sensor.

Then, for the meta object conveyer, the related functionality may be described using a state diagram, e.g. representing the ON/OFF state of the conveyer motor.

As shown in FIG. 3, also a sensor may be abstracted away from the real world and again be described through a related state diagram characterizing typical states of the sensor in general, i.e. a state where a measurement is completed and a state where a signal is analyzed and related state transition to analyze the signal into duo measurement, respectively.

As shown in FIG. 3, yet another important aspect of the present invention is a meta representation of states on different levels of abstraction. As shown in FIG. 3, such an abstracted state representation for the meta object conveyer would be, e.g. a meta state signal analyzed, a specification of a target feature to a target velocity, and a specific representation of an actual feature showing the actual speed of the conveyer during run time.

As shown in FIG. 3, similarly, the meta state representation for the meta object sensor may be again be a categorizing feature being signal analyzed, a target feature to specify that the detection result state is given, and as an actual feature, an object ID to be object ID equal ID3456.

Figure 4:
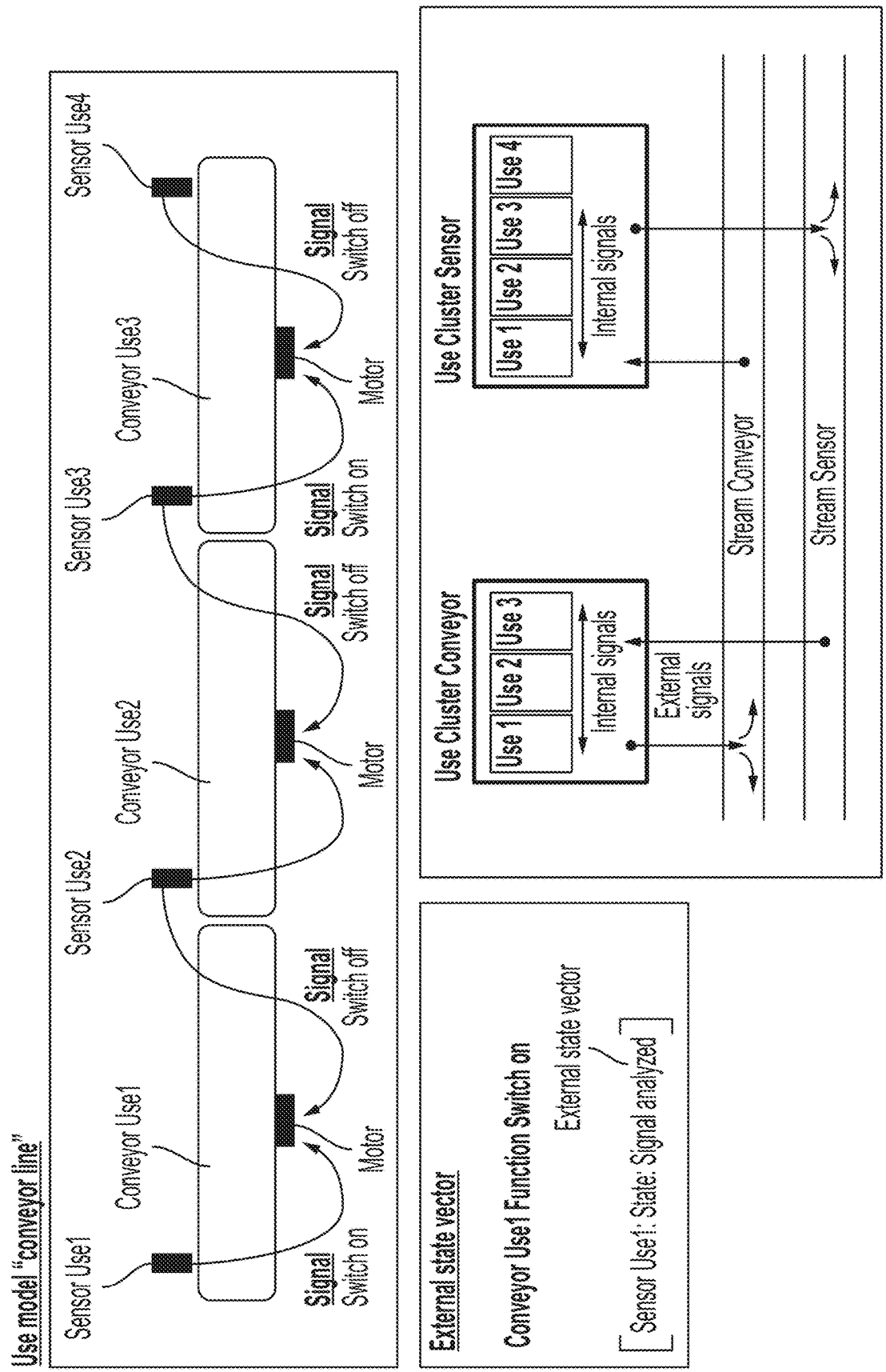
FIG. 4 shows examples of modeling on a use model layer or equivalently template layer to define clusters of meta models of subsystems.

FIG. 4 shows examples of modeling on a use model layer or equivalently template layer to define clusters of meta models of subsystems.

Here, the object is to define use objects as cluster of digital twin objects such that all digital twin objects within a cluster share a common set of descriptive features, a common subset of globally valid events, a common set of states and a common set of state models.

Here, clusters of meta models of subsystems use a common language scope, semantics and behavior of meta models of subsystems as well as a common set of meta data, features and properties.

As shown in FIG. 4, the use level modeling differs over the meta level modeling in that it is more specific about the actual use of conveyers and sensors described in an abstract matter on the meta level.

As shown in FIG. 4, therefore the use model of the conveyer line recites different uses of the conveyer, i.e. a first to third use. Similarly, there are described four uses of a sensor.

Further, on the use layer, there are also introduced so-called external state vectors implying an operation upon indication of a certain state in the overall system, e.g. the conveyer use one function as switched ON when the state of the sensor use one is such that it indicates that a signal is analyzed.

As shown in FIG. 4, yet another aspect of use level modeling according to the present invention to be described in more detail in the following is the set-up of clusters. Here, the identified uses of different system components like conveyer and sensors are summarized in so-called use clusters such that different meta object types are assigned to a related cluster, respectively. Then, the exchange of information between use clusters is achieved on so-called meta streams.

As shown in FIG. 4, each use cluster sends external signals as a meta stream, i.e. the use cluster conveyer sends external signals on the stream conveyer while the use cluster sensor sets external signals on the stream sensor. Further, each use cluster listens to external signals from at least one meta stream being different from its own sending meta stream, e.g. the use cluster conveyer listens to external signals of use cluster sensor on the stream sensor. Otherwise, within the use cluster, there may also be exchanged internal signals.

The use level modeling and the set-up of use clusters and related meta stream therebetween according to the present invention is of significant importance to reduce complexity during real-time process control of the overall distributed event-discrete system. The reason for this is that, contrary to an any-to-any routing topology, the number of components to be addressed is given by the number of clusters, not by the number of actual components of the system.

FIG. 5 shows examples of modeling on a twin layer to describe subsystems as instances of clusters of meta models of subsystems.

Here, each instance maps the logical behavior of a subsystem. In the following digital twin level instances will equivalently referred to as digital twins.

Thus, a third level of abstraction in the modeling of distributed event-discrete systems according to the present invention is an abstraction level named digital twin level.

Here, the object is to define digital twin objects of real world process objects which model real world devices, data, messages, task specifications etc.

The outcome of the twin layer modeling is shown as example in FIG. 5. Here, it is assumed that two conveyer lines are set up.

As shown in FIG. 5, for the conveyer there are three use scenarios, nevertheless, six twin instantiations such that twin 1 to twin 3 of the conveyer set up the conveyer line 1, while twin 4 to twin 6 of the conveyer set up conveyer line 2.

Further, for the sensor use, there are specified four uses with respect to conveyer line 1 and 2, respectively. Then, for each sensor use there are two twins t1, t4 further t2, t5, further twin 3, twin 7, and finally twin 4, twin 8.

As can be seen in from FIG. 5, only at determination of the modeling on the twin layer, a full model of the distributed event-discrete system is generated.

Figure 6:
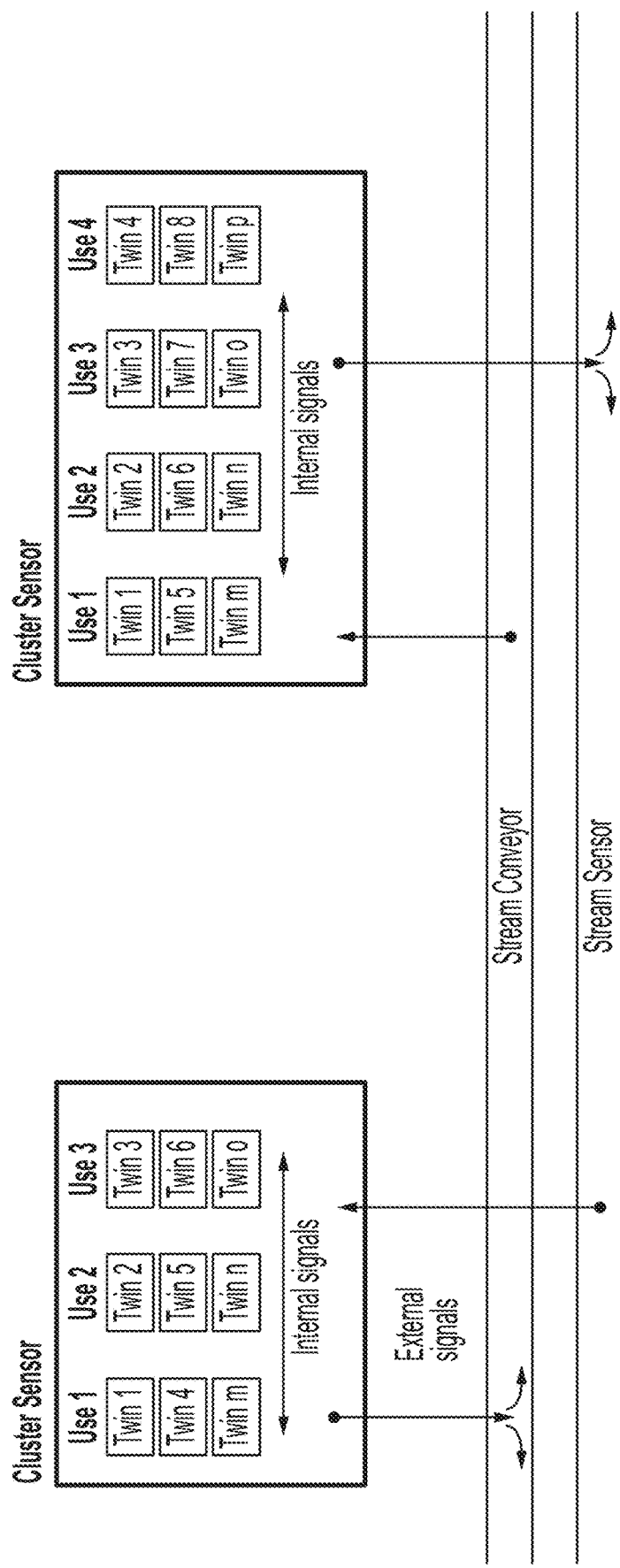
FIG. 6 shows a result of modeling on a meta level as shown in FIG. 3 in combination with modeling on a use level as shown in FIG. 4 and in combination modeling on a twin layer as shown in FIG. 5.

FIG. 6 shows a result of modeling on a meta level as shown in FIG. 3 in combination with modeling on a use level as shown FIG. 4 and in combination with modeling on a twin layer as shown in FIG. 5.

As shown in FIG. 6, the complete system shown in FIG. 5 is modelled across three layers of abstraction, i.e. the meta model object representation used for set-up of clusters like the cluster conveyer and the cluster sensor, then, the use level modelling to categorize use of system components characterized on the meta level according to the type of meta modeling, and then followed by instantiation of the different use scenarios for each cluster on the twin level.

As shown in FIG. 6, the interoperation between different system clusters is then achieved on the basis of meta streams in relation to the different clusters so as to significantly reduce the overall load for exchange of information during the real-time process control of the overall distributed event-discrete system, to be described on a more detailed level in the following.

Figure 7:
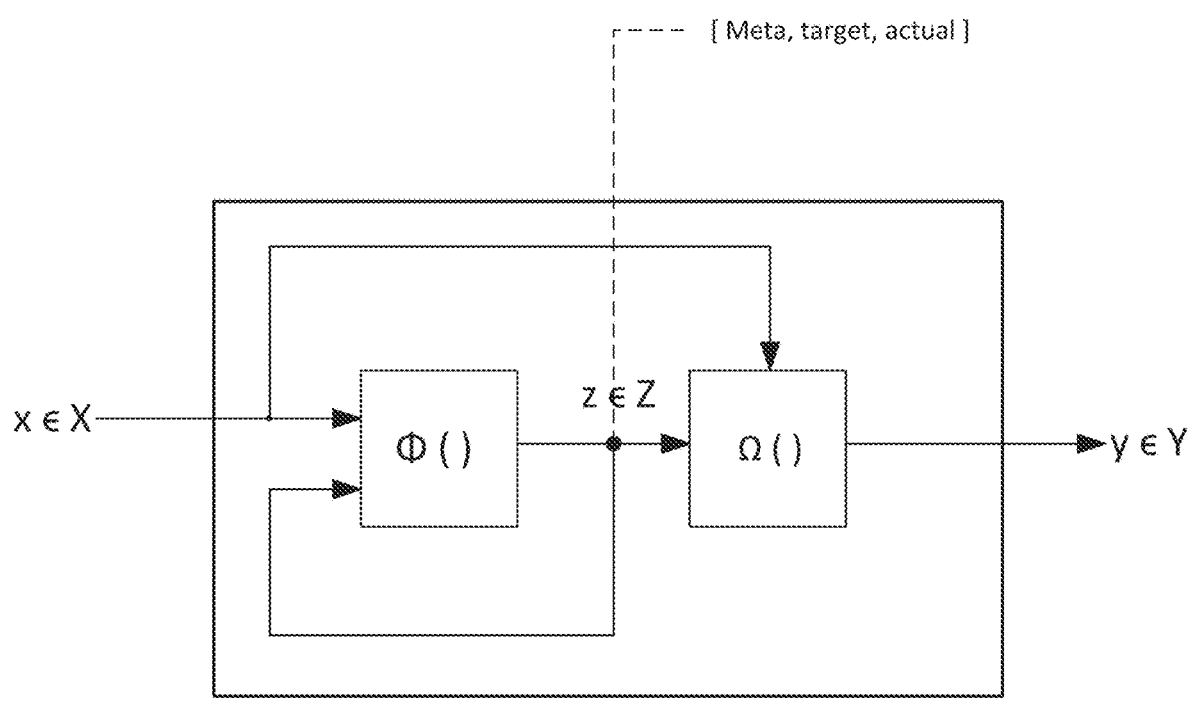
FIG. 7 shows a general outline of a state space model used according to the present invention for the modeling of distributed event-discrete systems.

FIG. 7 shows a general outline of a state space model used according to the present invention for the modeling of distributed event-discrete systems.

Generally, according to a state model a system is described by an input vector $x=(x1, \ldots, xk)T \in X$, an output vector $y=(y1, \ldots, yn)T \in Y$, and a system operator S mapping the input vector x to the output vector y according to $y=S(x)$.

In more detail, the mathematical model uses state variables to model system states which are summarized into a state variable vector $z=(z1, \ldots, zm)T \in Z$.

The composition of the input vector x, the state variable vector z, and the output vector y may be represented using at least two functions:

A first function is a state transition function $\Phi: Z \times X \to Z$ which determines a transition to target state(s) $z' \in Z$ as a function of an initial state(s) $z \in Z$ and an input vector $x \in X$ at occurrence of a system event to describe the dynamic behavior of the system.

The second function is an output function $\Omega: Z \times X \to Y$ which determines an output vector $y \in Y$ as a function of the state variable vector $z \in Z$ and the input vector $x \in X$.

Optionally, for some types of event discrete systems there may be defined a third function being a retention time function $\tau: Z \to R+$ defining the retention time with respect to a state variable vector $z \in Z$.

Further, it should be noted that with respect to the existence and type of input vectors x an empty input vector x corresponds to an autonomous system or equivalently a data generator. Also, an empty input vector x in combination with an empty output vector y relates to systems that may be described by a Markov Chain model.

As shown in FIG. 7, a characteristic according to the present invention is the type of representation of a state in the state model. According to the present invention it is suggested to have different types of abstraction for state representation according to meta level, target level, and actual level, as exemplified above in FIG. 3.

These different types of abstraction for state representation according to the present invention allow for a significant reduction of complexity in the handling of the process control of the distributed event-discrete system. The reason for this is that while, e.g. the target of a sub system used to specify a control behavior might be in the real-time domain and thus be of infinite number of values. Nevertheless, on abstraction of a way of such a real range into meta level types of, e.g. low speed, medium speed, high speed, will then lead to a reduction of complexity in the handling of, e.g. a conveyer line as described above.

Figure 8:
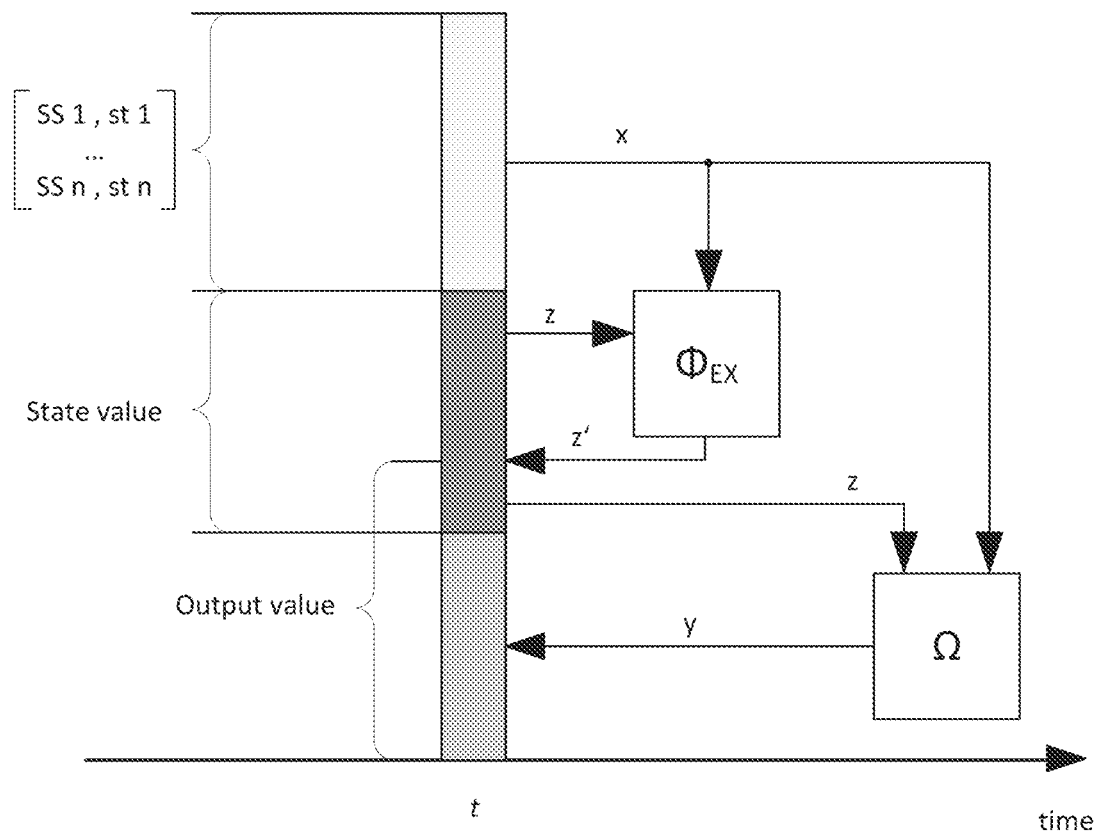
FIG. 8 shows a further detailed representation of the state space model shown in FIG. 7.

FIG. 8 shows a further detailed representation of the state space model shown in FIG. 7.

As shown in FIG. 8, a state transition function $\Phi$ may be decomposed at least into an external state transition into $\Phi ex$ to describe state transitions due to system external events, respectively.

In more detail, as shown in FIG. 8, according to the present invention there is considered a state where a state transition in a first sub system is influenced by states of further subsystems not being identical with the first sub system.

As shown in FIG. 8, there may be considered a state model for a specific sub system and a related transition $\Phi EX$ triggered by an external state vector summarizing an identification of external subsystems and related states to, e.g. SS 1, st 1, . . . , SS n, st n. Assuming that each of these subsystem is in the specified state, then, according to the present invention, there is considered an external state transition within the subsystem in line with the external state vector.

The concept of the external state vector implies a trigger for state transition within a specific subsystem and supports parallelization in the process of system modeling with respect to interaction between subsystems of the distributed event-discrete system. The external state vectors may be set up in a flexible manner to increase or decrease granularity on the level of conditions securing a state transition in a specific subsystem.

Figure 9:
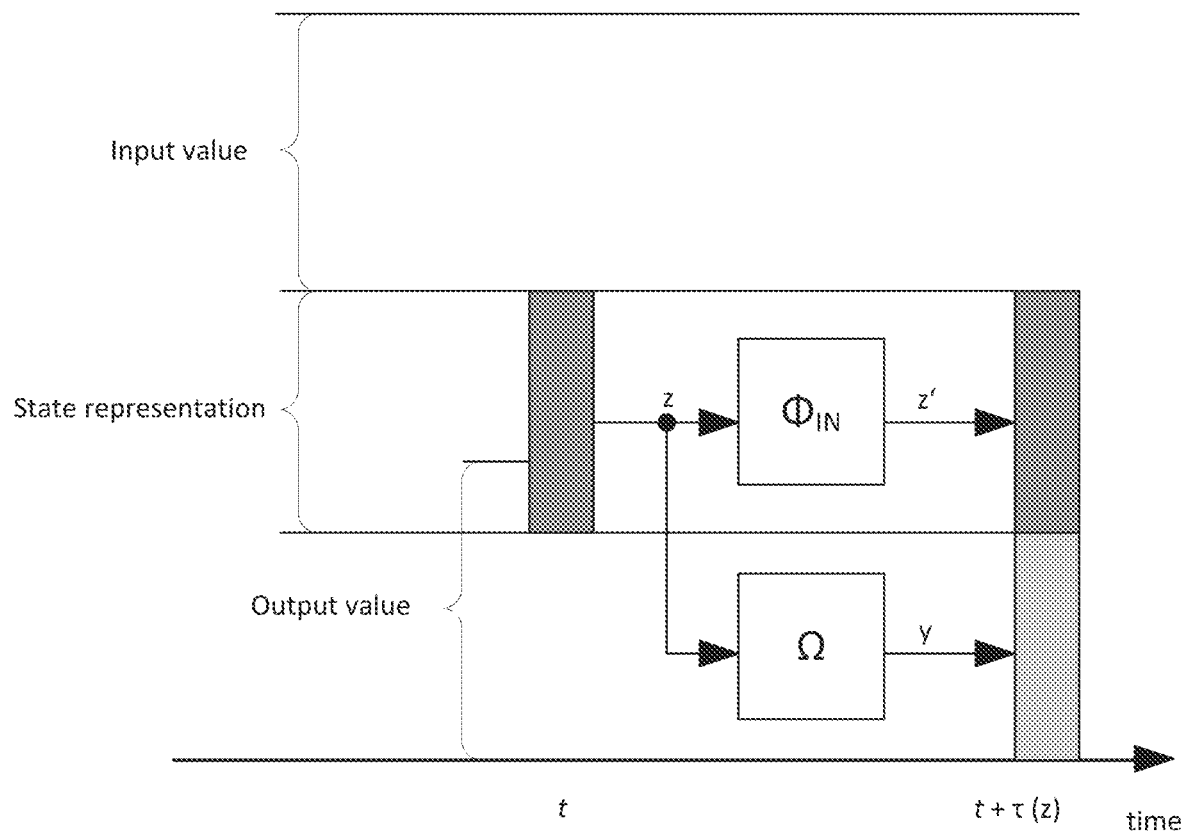
FIG. 9 shows a further detailed representation of the state space model shown in FIG. 7.

FIG. 9 shows a further detailed representation of the state space model shown in FIG. 7.

As shown in FIG. 9, a state transition function Φ may further be decomposed at least into an internal external state transition into Φin to describe state transitions due to system internal events.

As shown in FIG. 9, also the internal state transition is triggered by consideration of the state representation of at least one state within the system. Assuming that a state representation is prevailing which triggers a state transition, then the overall state space model representation of the sub system may be updated. It should be noted that the change of an internal state within a specific sub system may constitute an external event to a remote sub system and trigger a state transition in the remote sub system as explained above with respect to FIG. 4.

In view of the above, in the following there will be explained a modeling of a distributed event-discrete systems in general as basis for an understanding of the principles underlying the present invention.

In more detail, state model of a distributed event-discrete system is defined by a 7-tuple $\Sigma = <X, Z, Y, \Phi in, \Phi ex, \Omega, \tau,>$ wherein X is the finite set of input vectors $x \in X$;
Z is the finite set of state variable vectors $z \in Z$;
Y is the finite set of output vectors $y \in Y$;
Φn: $Z \to Z$ is the state transition function for internal events;
Φex: $Z \times X \to Z$ is the state transition function for external events;
Ω: $Z \times X \to Y$ is the output function; and
τ: $Z \to R+$ is the retention time function.

According to the present invention input vectors $x \in X$ to distributed event-discrete systems are called external events. Upon occurrence of an external event the system state $z \in Z$ may change to $z' \in Z$ according to $$z'(t) = \Phi ex(x(t), z0(t)).$$

Here $z0(t) \in Z$ is the initial state of the distributed event-discrete system or initial state in short and $z'(t)$ is the target state of the distributed event-discrete system or target state in short.

Further, as outlined above with respect to FIG. 9 state transitions without input are generated due to internal events which may occur over time. The distributed event-discrete system remains in the state z over a retention time $\tau(z)$. Upon expiry of the retention time $\tau(z)$ there is generated a new state which is determined by the internal state transition function according to $$z'(t+\tau(z)) = \Phi in(z(t)).$$

Further, upon occurrence of a state transition also the output vector is updated according to $$y(t) = \Omega(z(t), x(t)).$$

where z(t) is again the initial state. It should be noted that x(t) may be the zero vector when no inputs or equivalently no external events prevail.

As mentioned above, the retention time function τ determines the duration of every partial state $zi \in z = (z1, \ldots, zm)T$. Any change in a partial state implies a change of the state variable vector $z \in Z$.

Assuming that ti is the starting time of partial state zi and that $\tau 1, \ldots, \tau m$ are the retention times for the partial states $z1, \ldots, zm$ as determined at the starting time ti, then the retention time function for partial state zi at time ti may be determined according to $$\tau(zi) = \min(\tau 1, \ldots, \tau m).$$

Generally, according to the present invention it is assumed that events in distributed event-discrete system occur at random points in time so that state transitions may be calculated using stochastic state models. A special case of a distributed event-discrete system then may be the deterministic time discrete state model having sample time tA where $\tau(zi) = tA$ for $i \in (1, \ldots, m)$ and $ti = tj$ for all $i, j \in (1, \ldots, m)$ with $i \neq j$.

On the basis of the explanations given above in the following there will be described principles of deriving a meta model for distributed event-discrete systems according to the present invention.

As exemplified above with respect to FIG. 3, on the meta modeling level there are specific types of meta models referred to as meta object types in the following which serve to model specific types of subsystems of the distributed event-discrete system.

In more detail, according to the present invention a meta object type specifies a meta model of state representations and related semantics. Meta object types also specify transformation functions or equivalently a language range and a logic behavior of the subsystem being modeled through reference to at least one corresponding state space model.

In the following it is assumed—without loss of generalization—that we model a subsystem SS with a meta object MO having a specific but not yet fixed meta object type ●.

Thus ● is to be understood as placeholder for a meta object type or equivalently as characterizing a meta model type template.

The instantiation of a generic meta object type to a specific use thereof is then achieved through parametrization of the placeholder ● where different use scenarios are handled by multiple parametrizations.

According to the present invention a first element of a meta model of a meta object type MO● is a representation object MO●R representing a set D●={d1●, . . . , do●} of descriptive features of the meta object type MO●.

Further, according to the present invention in the meta model the at least one meta object type MO● may be perceived under different perspective views on the meta object type MO● being described a set P●=(p1●, . . . , pv●) of perspectives on a meta object type MO●.

According to the present invention a second element is at least one meta object type MO● to model a subsystem of the distributed event-discrete system, wherein the at least one meta object type MO● references at least one state model Σi● i=1, . . . , s in relation to the subsystem.

In more detail, according to the present invention for each meta object type MO● the meta model specifies at least one state model Σi● i=1, . . . , s representing an event discrete system according to $\Sigma i● = <Xi●, Zi●, Yi●, \Phi ini●, \Phi exi●, \Omega i●, \tau i●>$ such that the overall state model of the meta model type MO● is $\Sigma ● = Ui\ \Sigma i●$.

The reason for the reference to than one state model Σi● by a meta object type MO● is that one and the same meta object type MO● may be perceived under different criteria each forming a perspective view on the meta object type MO● and the underlying subsystem to be modeled. From this it is meaningful to have one state model Σi● per perspective view used by the meta object type MO●. In the following the set of perspectives on a meta object type MO● is described as P●={p1●, . . . , pv●}.

Further, for each state model Σi● there exists a state variable vector $zi● = (zi●1, \ldots, zi●z)T \in Zi●$. According to the present invention each k-th state in zi●, i.e. state zi●k in each state model Σi● may be described using different levels of data abstraction like meta data, discrete values or continuous values for target values, and discrete or continuous values for actual values.

Thus, according to the present invention each state $zi●k$ has a meta model being a set of partial states $zi●k,p$ described according to at least one state $zi●k$ in the at least one state model $Σi●$ i=1, . . . , s has a meta model being a set of partial states $zi●k,p$ using different levels of data abstraction according to a set of meta features $MFi●k,1=\{fc1, \ldots, fcc\}i●k,1$ characterizing a state in a meta description domain;

a set of target features $TFi●k,2=\{ft1, \ldots, ftt\}i●k,2$ having discrete or continuous range of values characterizing a target for a considered state; and a set $AFi●k,3=\{fa1, \ldots, faa\}i●k,3$ of actual features $AFi●k,3=\{fa1, \ldots, faa\}i●k,3$ having discrete or continuous range of values representing an actual constellation of a considered state.

It should be noted that the use meta features characterizing a state in a meta description domain according to the present invention achieves an abstraction compared to the conventional state space representation. The abstraction according to the present invention allows for a meta state space representation. Here, each meta state space representation may summarize an infinite number of state space representations into a single meta state space representation and thus can significantly reduce modeling complexity.

Further, in the meta model a state transition in the i-th state model $Σi●$ of the meta object type $MO●$ from a first state $zi●a$ to a second state $zi●t$ is achieved through a process described by a functional model $Φi●at: Zi●x Xi●→Zi●$. Thus any state transition is assigned exactly to one state model $Σi●$ and there is exactly one state transition from $zi●a$ to $zi●t$.

Here, according to the present invention the functional model represents a data flow model according to meta features, target feature, and/or actual features. The data flow model describes a control flow operating on meta data and a data flow operating on data reflecting target features and/or actual features.

It should be noted the functional model $Φi●at$ generally applies to state transitions due to external events and/or internal events being relevant to a specific meta object type $MO●$ according to $Φex,i●at$ and $Φin,i●at$, respectively.

Here, the functional model $Φex,i●at$ represents a meta model of a state transition triggered by at least one external event relevant for a specific meta object type $MO●$. Further, it describes a data flow model according to different levels of data abstraction, i.e. with respect to meta features, target feature, and/or actual features.

According to the present invention in the most general sense the data flow model describes a control flow operating on meta data and a data flow operating on data reflecting target or actual features. The incorporation of data flow into the data flow model allows for specification of conditions for state transitions.

Further, according to the present invention a first input to the functional model $Φex,i●at$ is at least one vector of external states or equivalently external state vector $Θex, i●at,l=((MOj, j≠●, zj), \ldots, (MOk, k≠●, zk))IT$, where l is an index to the l-th external state vector and each external state vector respectively summarizes tuples of subsystems external to a subsystem being modeled using the meta objet type $MO●$ and corresponding states in which the external subsystems indicated to prevail.

Thus, when a certain set of subsystems being external to a subsystem type being modeled using the meta model type $MO●$ and under consideration are in specific states, respectively, this may trigger a state transition from $zi●a$ to $zi●t$ in one of the state models $Σi●$ of the meta object type $MO●$ used for modeling a subsystem under consideration. The identification of the relevant state models $Σi●$ and of the type of state transitions will be explained in more detail in the following.

Further, the reason for consideration of more than one external state vector $Θex,i●at,l, l>1$, is that even if different subsystems prevail in different states, respectively, this may nonetheless trigger a same state transition from $zi●a$ to $zi●t$ in the subsystem state model $Σi●$ of a meta object type $MO●$ under consideration.

Further, let $πex,i●a=U1\ Θex,i●at,l$ be the set of all external state vectors that may trigger a state transition with respect to the initial state $zi●a$ in state model $Σi●$ of a meta object type $MO●$.

Further, according to the present invention a second input to the functional model is represented as a vector $Δex,i●a$ summarizing a set of conditions that must be met prior to triggering a state transition with respect to the initial state $zi●a$ in state model $Σi●$ of a meta object type $MO●$ due to an external event. Typically such conditions will be specified of the basis data reflecting target features and actual features.

Further, to conclude with meta modelling of meta object types $MO●$ according to the present invention there is introduced a set of contexts $C=\{con\_ID1, \ldots, con\_IDk\}$.

Here, every context models a potential relation between two twin objects representing digital instantiations of meta object types $MO●$, or in other words a potential relation between instantiations of components of the distributed event-discrete system on a twin level as will be explained in more detail below.

Generally, contexts are defined in relation to functional models and are valid for all meta object types $MO●$ which reference the functional models. Also, contexts are assigned in an unambiguous manner to a perspective.

In view of the above, according to the present invention the functional model $Φex,i●at$ may be modelled as a meta model data flow according to:

$Φex,i●at: zi●a∈Zi●x$
$πex,i●a×Δex,i●a×con\_IDa\ x$
$MFi●a,1×TFi●a,2×AFi●a,3→$
$zi●t∈Zi●×con\_IDt\ x$
$MFi●t,1×TFi●t,2×AFi●t,3$ Further, according to the present invention a similar functional model $Φin,i●at$ may be modeled as a meta model data flow with respect to an internal state transition in the meta object type $MO●$ and its state model $Σi●$ according to:

$Φin,i●at: zi●a∈Zi●x$
$πin,i●a×Δin,i●a×con\_IDa\ x$
$MFi●a,1×TFi●a,2×AFi●a,3→$
$zi●t∈Zi●×con\_IDt\ x$
$MFi●t,1×TFi●t,2×AFi●t,3$ In the above functional models representational elements may be identified as follows:

$zi●a∈Zi●$ is the source state selected from a set of all states $Zi●$ of the at least one state model $Σi●i= 1, \ldots, s$) of the meta object type $MO●$;

$zi●t∈Zi●$ is the target state selected from a set of all states $Zi●$ of the at least one state model $Σi●i=1, \ldots, s$ of the meta object type $MO●$;

$πex,ini●a$ is the set of the external or internal state vectors triggering the state transition from the source state $zi●a$ to the target state $zi●a$;

Δex,ini●a is the vector of conditions triggering the state transition from the source state zi●a to the target state zi●t;

con_IDa is context identification of the context prevailing for the subsystem being modeled by the meta object type MO● prior to the state transition from the source state zi●a to the target state zi●t;

con_IDt is context identification of the context prevailing for the subsystem being modeled by the meta object type MO● after the state transition from the source state zi●a to the target state zi●t;

MFi●a,1×TFi●a,2×AFi●a,3 is a representation of values for the meta feature, target feature, and actual feature at the source state zi●a prior to state transition to the target state zi●t; and MFi●t,1×TFi●t,2×AFi●t,3 is a representation of values for the meta feature, target feature, and actual feature at the target state zi●t after state transition to the target state zi●t.

In conclusion, according to the present invention irrespective on how a specific transformation is realized it will operate on two levels of abstractions, i.e. a control flow operating on meta data and a data flow achieving a link between meta data level, target conditions and actual conditions, e.g., captured by sensors. Thus, the introduction of a control flow operating on meta data allows to handle an infinite number of states in a computational very efficient manner.

Further, it should be noted that a state transition may as well be triggered by a combination of at least one external event and at least one internal event.

In the following different aspects of computer implemented meta modelling of a distributed event-discrete system and related use of the computer implemented meta model for real time process control of the distributed event-discrete system will be described.

Figure 10:
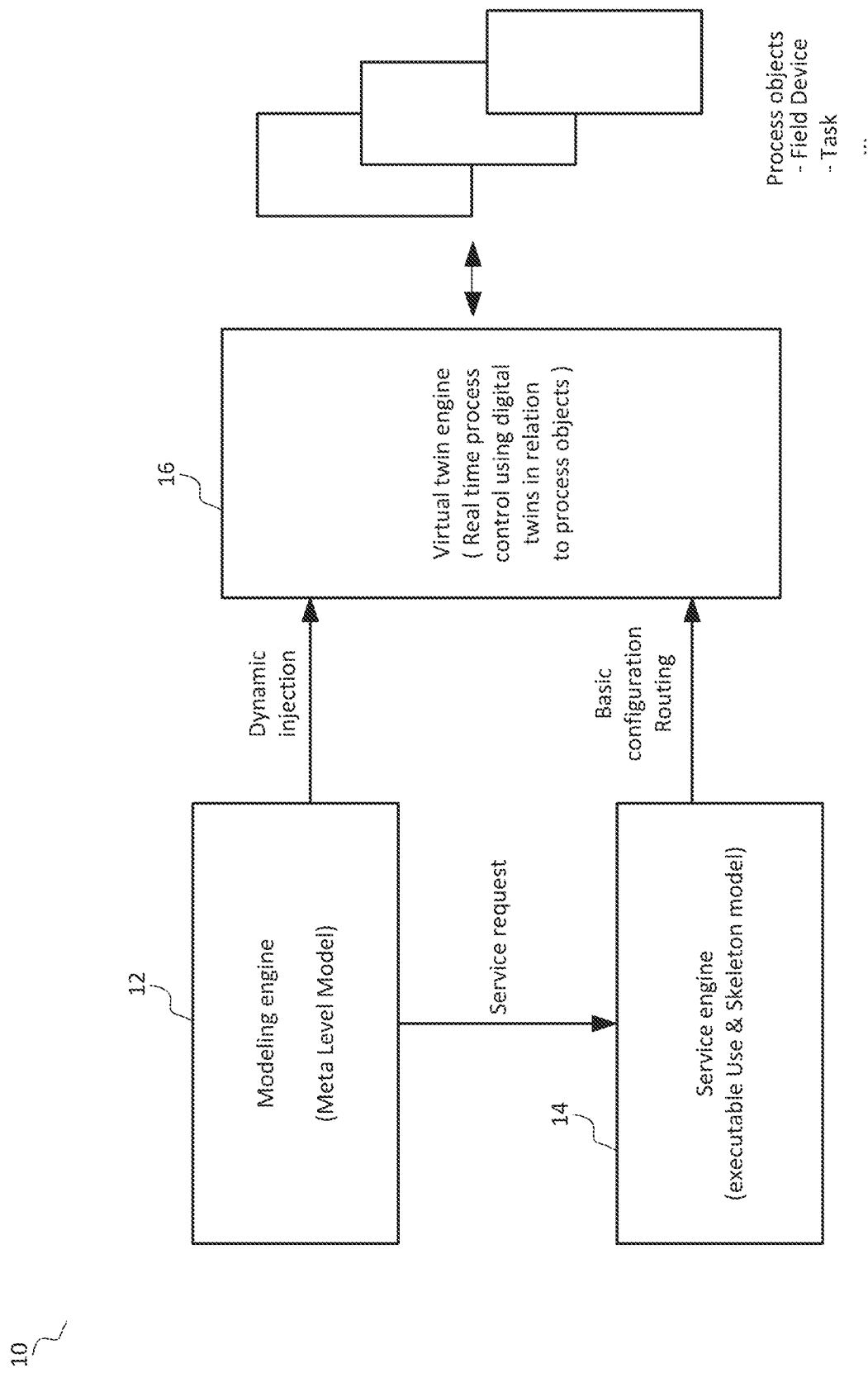
FIG. 10 shows an overview for on a system adapted to model a distributed event-discrete system and to execute real time process control of the distributed even-discrete systems according to the present invention.

FIG. 10 shows an overview for on a system adapted to model a distributed event-discrete system and to execute real time process control of the distributed even-discrete systems according to the present invention.

As shown in FIG. 10, the system 10 according to the present invention comprises a modeling engine 12, a service engine 14, and virtual twin engine 16. The virtual twin engine 16 forms a virtual counterpart to real world process objects.

Here, process objects are, e.g., field devices which are to be controlled during operation of the distributed event-discrete system. Nevertheless, according to the present invention there is not imposed any restriction on the type of process object which may also be related to tasks to be achieved within the distributed event-discrete system and, e.g., also model different types of information, etc.

Operatively, the modeling engine 12 drives a meta level model of the distributed event-discrete system as outlined above. Once such meta level model for the distributed event-discrete system is available, the modeling engine 12 issues a service request to the service engine 14.

Further operatively, the service 14 achieves a modeling of the distributed event-discrete system on the use level as outlined above and further repairs an executable software skeleton reflecting the outcome of the use level modeling of the distributed event-discrete system.

As also shown in FIG. 10, the modeling engine 12 and the service engine 14 have an interface to the virtual twin engine 16.

Operatively, the service engine 14 forwards the executable software skeletons in relation to different types of component clusters as explained above to the virtual twin engine 16 for pre-installation therein. Also, the service engine 14 forwards the routing topology derived during use level modeling of the distributed event discrete-system to the virtual twin engine 16 for establishment of related communication processes within the virtual twin engine 16 as explained above.

As shown in FIG. 10, operatively, the modeling engine 12 may also inject components of modeling to the virtual twin engine 16 in real-time and in dynamic manner. This serves to modify the overall model of the distributed event-discrete system in real-time so as to increase flexibility of the modeling and process control method as will be explained in more detail in the following.

Figure 11:
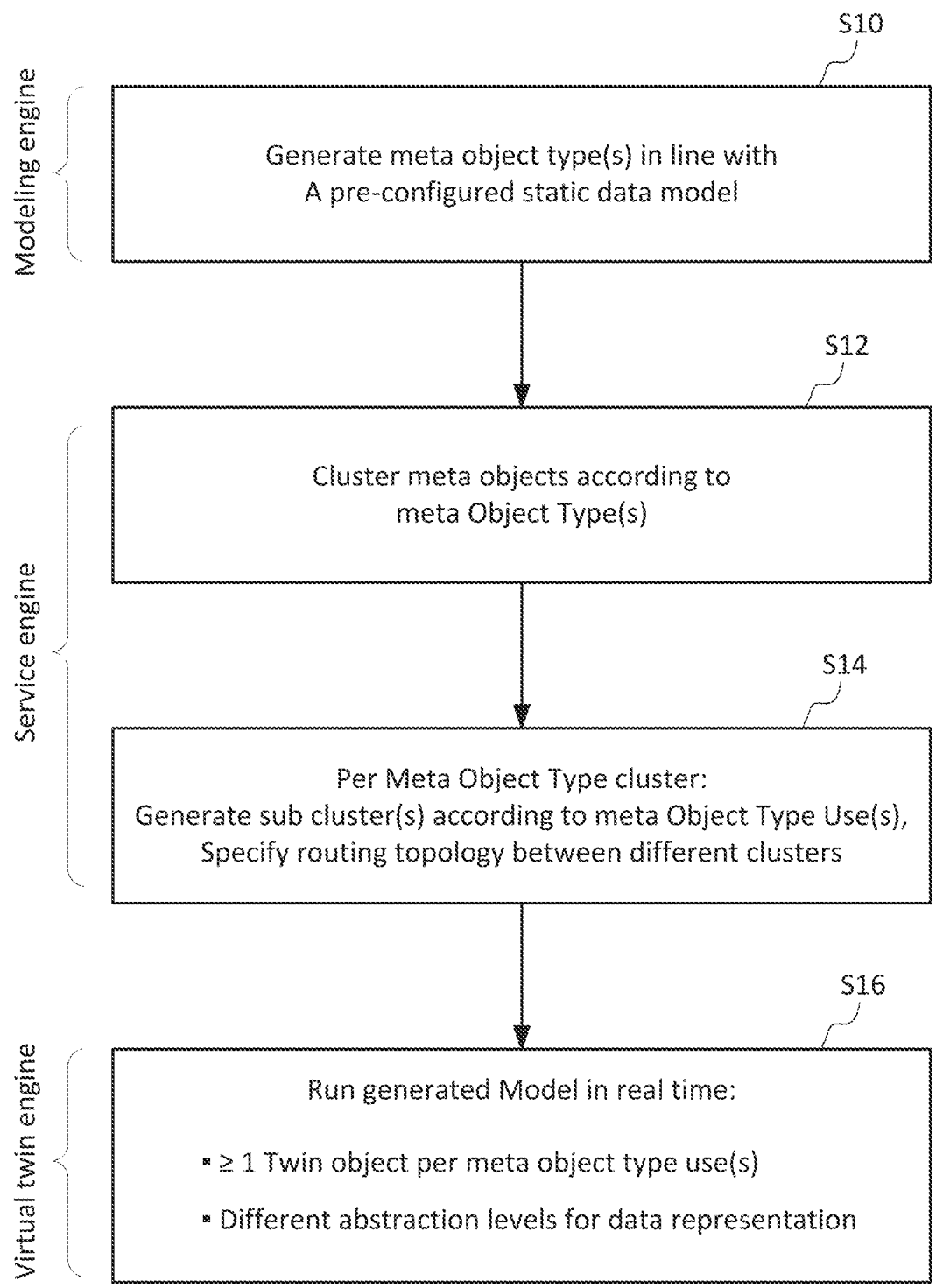
FIG. 11 shows a basic flowchart of operation for the system adapted to model a distributed event-discrete system and to execute real time process control of the distributed even-discrete systems according to the present invention.

FIG. 11 shows a basic flowchart of operation for the system adapted to model a distributed event-discrete system and to execute real time process control of the distributed even-discrete systems according to the present invention.

As shown in FIG. 11, initially, in a step S10 executed by the modeling engine 12, there is generated at least one meta object type in line with the pre-configured static data model to be explained in the following with respect to FIG. 12.

Then, in a step S12 executed by the service engine 14, sub systems of the distributed event-discrete system are clustered according to meta object type(s). Also, the service engine 14 executes a step S16 per cluster object to generate sub clusters in relation to uses of meta object type (s). Also, the service engine 14 achieves a specification of a routing topology between different clusters.

As shown in FIG. 11, then follows a step S16 executed by the virtual twin engine to run the generated model in real-time. Here, the virtual twin engine 16 will allocate at least one twin object per meta object type use(s) and also use different levels of abstraction with respect to data representation as will be explained in more detail in the following.

Figure 12:
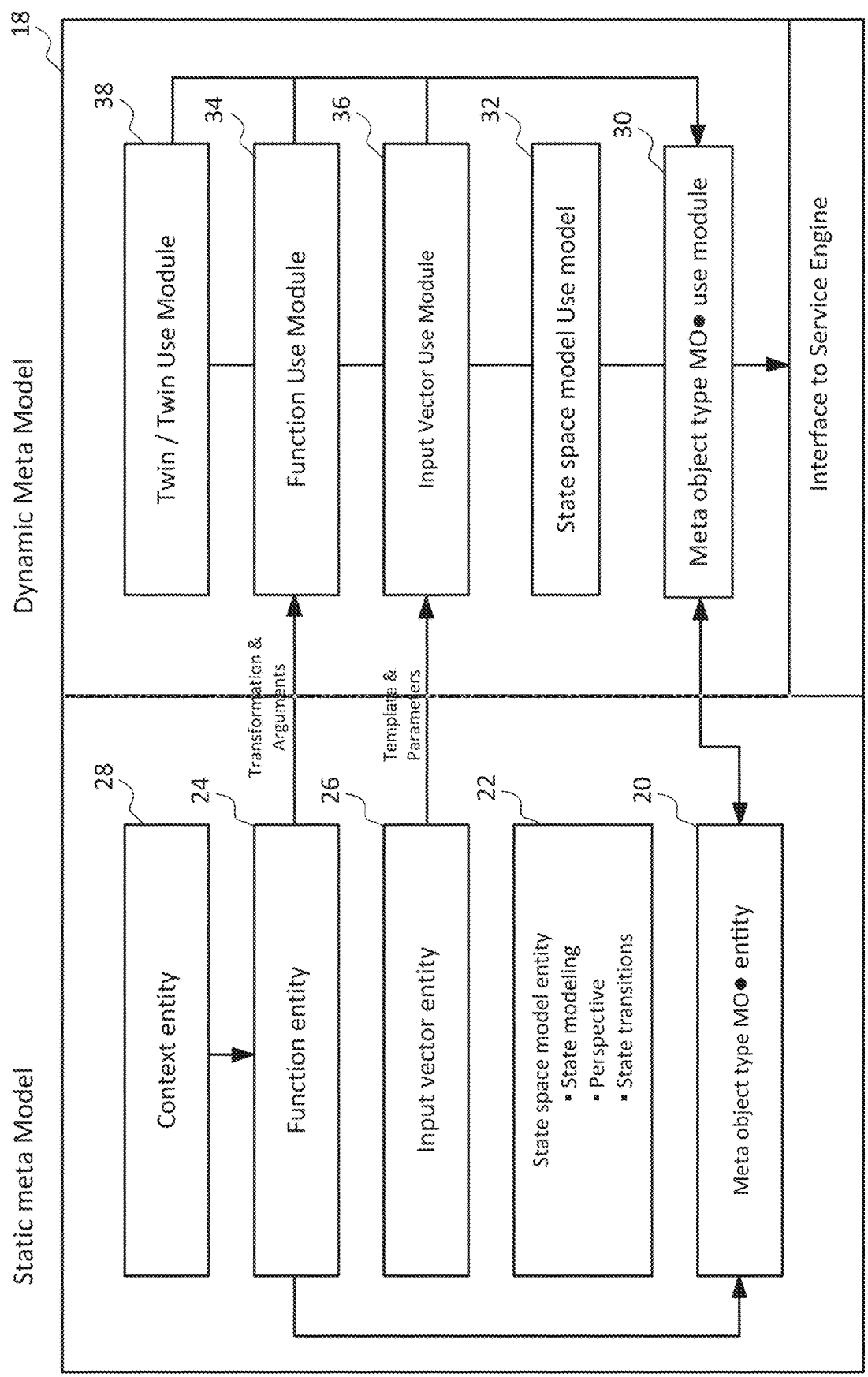
FIG. 12 shows a schematic diagram of a computer implemented meta model according to the present invention which is used by the modeling engine shown in FIG. 10.

FIG. 12 shows a schematic diagram of a computer implemented meta model which is used by the modeling engine according to the present invention as shown in FIG. 10.

As shown in FIG. 12, a computer implemented meta model according to the present invention divides into a static meta model and into a dynamic meta model. Here, the static meta model comprises a plurality of entities respectively being a repository for build-up of a real-time capable model of a distributed event-discrete system.

On the other hand, the dynamic meta model part of the computer implemented meta model will reference at least partially the entities of the static meta model for transfer of modeling option provided by the different entities into an actual meta model of a sub system of the distributed even-discrete system.

As shown in FIG. 12, the static meta model of the computer implemented meta model 18 for modelling at least one subsystem of a distributed event-discrete system comprises at least one meta object entity 20 describing a meta object type MO● used to model a subsystem of the distributed event-discrete system.

As shown in FIG. 12, the at least one meta object entity 20 references a state space model entity 22 specifying at least one state model $\Sigma i$● with $i \geq 1$ in relation to the subsystem. In the state space model entity 22 the at least one state zi●k in the at least one state model $\Sigma i$● is represented by a meta model being a set of partial states zi●k,p using different levels of data abstraction according to a set of meta features MFi●k,1={fc1, ... , fcc}i●k,1 characterizing a state in a meta description domain;

a set of target features TFi●k,2={ft1, ..., ftt}i●k,2 having discrete or continuous range of values characterizing a target for a considered state; and a set AFi●k,3={fa1, ..., faa}i●k,3 of actual features AFi●k,3={fa1, ..., faa}i●k,3 having discrete or continuous range of values representing an actual constellation of a considered state.

Further, the at least one meta object entity 20 references a representation entity specifying at least one representation object MO●R representing a set D●={d1●, ..., do●} of descriptive features of a meta object type (MO●).

Further, the at least one meta object type MO● is perceivable under different perspective views on the meta object type MOS being described as a set P●={p1e, ..., pv●} of perspectives on the at least one meta object type (MO●).

As shown in FIG. 12, the static meta model of the computer implemented meta model comprises a functional entity 24 representing a state transition in the at least one state model Σi● from a source state zi●a to a target state zi●t by a functional model Φi●at: Zi● x Xi●→Zi● representing a data flow model according to meta features, target feature, and/or actual features.

According to the present invention the functional entity 24 represents the data flow model as a control flow operating on meta data and a data flow operating on data reflecting target features and/or actual features. Preferably, wherein the functional entity 24 represents the functional model as a meta data flow Φex,i●at or Φin,i●at as explained above, wherein both are summarized into Φ(ex, in),i●at in the following.

As shown in FIG. 12, the static meta model of the computer implemented meta model comprises an input vector entity 26 representing a first input to the functional model Φ(ex,in)i●at as at least one state vector Θ(ex,in), i●at,l summarizing at least one tuple of an identification of a subsystem and a state in which the identified subsystem prevails.

Further, the input vector entity 26 represents a second input to the functional model Φ(ex,in),i●at as a vector summarizing at least one condition Δ(ex,in),i●at that must be met prior to a state transition from a source state zi●a to a target state zi●t.

Further, the input vector entity 26 represents the at least one condition as data reflecting at least one target feature and/or at least one actual feature.

As shown in FIG. 12, the static meta model of the computer implemented meta model comprises a context entity 28 representing at least one potential relation between two twin objects representing digital instantiations of meta object types MO● as a set of contexts C={con_ID1, ..., con_IDk} in the sense outlined above.

Further to the above, aside of the stat meta model the computer implemented meta model 18 according to the present invention comprises a dynamic meta model part which uses the modeling options available from the entities of the static meta models to come up with a specific meta model of a subsystem of the distributed event-discrete system.

As shown in FIG. 12, the dynamic meta model of the computer implemented meta model 18 for modelling at least one subsystem of a distributed event-discrete system comprises a meta object type use module 30 adapted to select a meta object type MO● for modeling of the at least one subsystem of the distributed event-discrete system. As outlined above, the meta object type MO● references at least one state model Σi● i∈{1, ..., s} for modeling of the at least one subsystem of the distributed event-discrete system.

As shown in FIG. 12, the dynamic meta model of the computer implemented meta model 18 comprises a state space model use module 32 adapted to model the at least one state model Σi● i∈{1, ..., s} referenced by the selected meta object type MO●.

As shown in FIG. 12, the modeling of the at least one state model Σi● i∈{1, ..., s} is achieved through reference to the state space model entity 22 provided modeling options in general which are then transferred into model uses on the meta level by state space model use module 32.

Also, the state space model use module 32 is adapted to describe at least one state in the selected at least one state model Σi● i=1, ..., s with a meta model being a set of partial states zi●k,p using different levels of data abstraction as outlined above. As outlined above, different state models may have different associated perspectives.

As shown in FIG. 12, the dynamic meta model of the computer implemented meta model 18 comprises a representation use module adapted to model a representation object MO●R representing a set D●={d1●, ..., do●} of o descriptive features of the modeled at least one subsystem. Here, also the representation use model references the representation entity of the static meta model to instantiate at least one of the descriptive features described generally in the representation entity with respect to a specific modeling task.

As shown in FIG. 12, the dynamic meta model of the computer implemented meta model 18 comprises a function use module 34 adapted to model a state transition in the at least one state model Σi● from a source state zi●a to a target state zi●t by the functional model representing a data flow model according to meta features, target feature, and/or actual features as described above.

As shown in FIG. 12, the modeling of the functional model is achieved through reference to the function entity 24 of the static meta model providing general options to model functions. The general options are then transferred to a more specific function model through indication of applicable function transformations and indication of applicable arguments to realize the functional model Φex,i●at and/or the functional model Φin,i●at as explained above.

Also, at least potential relation between at least two twin objects representing digital instantiations of meta object types may be modeled by at least one context as explained above.

As shown in FIG. 12, the dynamic meta model of the computer implemented meta model 18 comprises a an input vector use module 36 adapted to model a first input to the functional model as external state vector or internal state vector as outlined above. Heretofore, reference is made to the input vector entity 26 of the static data model of the computer implemented meta model which provides input vector templates and related parameters. A similar approach applies to the modeling of the second vector specifying conditions for at least one state transition.

As shown in FIG. 12, the dynamic meta model part of the compute implemented meta model 18 according to the present invention also comprises a twin/twin use module 38.

The provision of such a twin use module 38 serves to already prepare a modeling of components of the distributed event-discrete system which per se are known to be a part of the distributed event-discrete system.

Thus, the related twin objects may be classified as pre-known or static, contrary to the digital twin object to be allocated in real-time during twin level modeling of the distributed event-discrete system to be described in the following.

Figure 13:
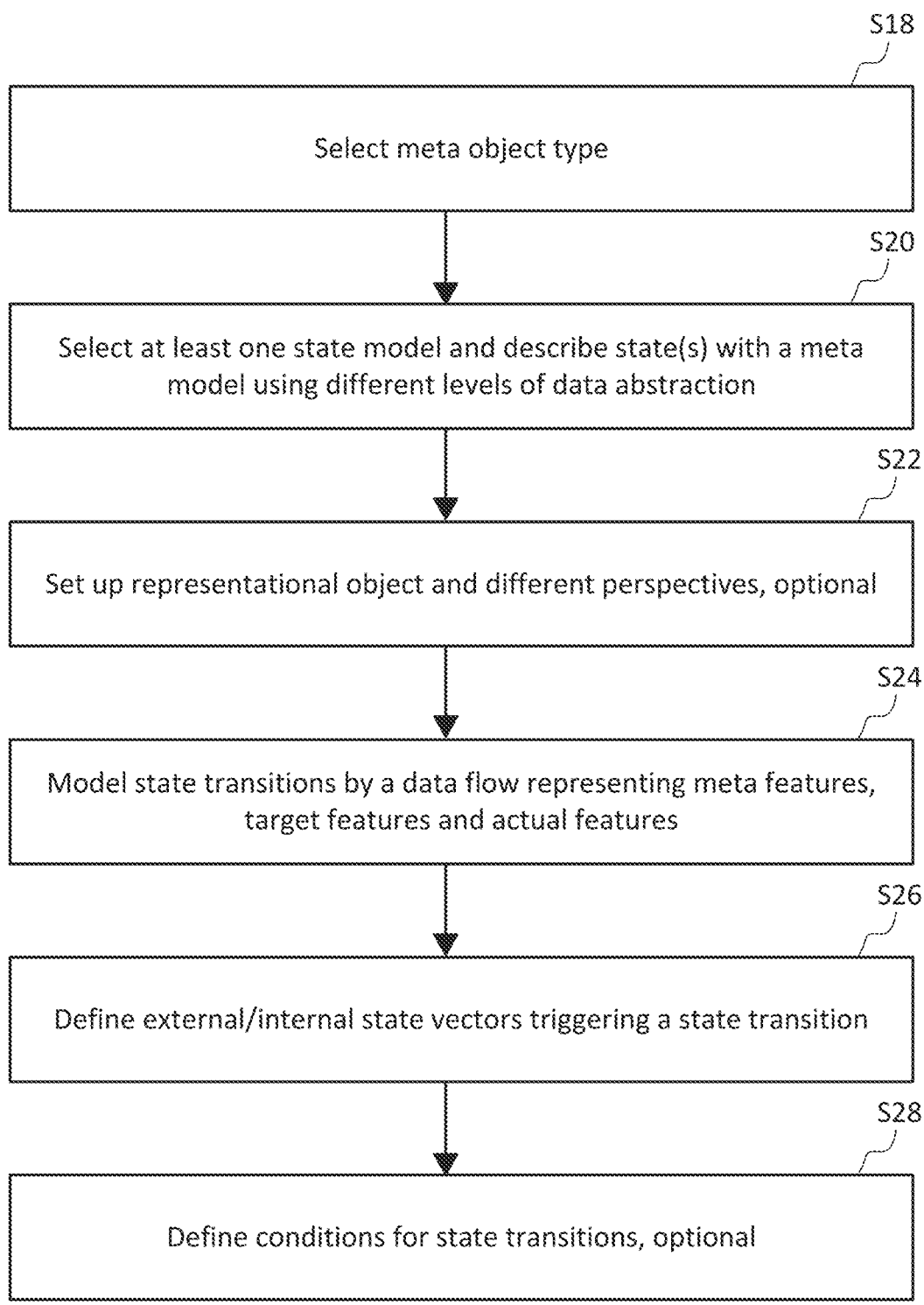
FIG. 13 shows a flowchart of operation for the modeling engine according to the present invention as shown in FIG. 10.

FIG. 13 shows a flowchart of operation for the modeling engine according to the present invention as shown in FIG. 10.

Generally, the modeling engine 12 according to the present invention runs the computer implemented meta model explained above with respect to FIG. 12.

As shown in FIG. 13, the modeling engine 12 executes a step S18, by running the meta object type use module 30, to select a meta object type MO● for modeling of the distributed event-discrete system. The meta object type MO● references at least one state model $\Sigma i●$ i∈{1, ..., s} for modeling of the at least one subsystem of the distributed event-discrete system.

As shown in FIG. 13, the modeling engine 12 executes a step S20, by running the state space model use module 32, to select at least one state model $\Sigma i●$ i∈{1, ..., s} referenced by the meta object type MO● for actual use during modeling of the at least one subsystem. In the step S20 the at least one state $zi●k$ in the selected at least one state model $\Sigma i●$ i∈{1, ..., s} is described with a meta model as outlined above.

As shown in FIG. 13, the modeling engine 12 executes a step S22, by running a related use module, to modeling a representation object MO●R and to select at least one perspective view, which step S22 is optional.

As shown in FIG. 13, the modeling engine 12 executes a step S24, by running the function use module 32, to model a state transition in the at least one state model $\Sigma i●$ from a source state $zi●a$ to a target state $zi●t$ by a functional model representing a data flow model according to meta features, target feature, and/or actual features as explained above. Here, the data flow model describes a control flow operating on meta data and a data flow operating on data reflecting target or actual features.

As shown in FIG. 13, the modeling engine 12 executes a step S26, by running the input vector use module 36, to model input vectors to the functional model which represent external state vectors and/or internal state vectors as outlined above.

As shown in FIG. 13, the modeling engine 12 executes a step S28, by running the input vector use module 36, to model conditions for state transitions, which step S28 is optional.

Figure 14:
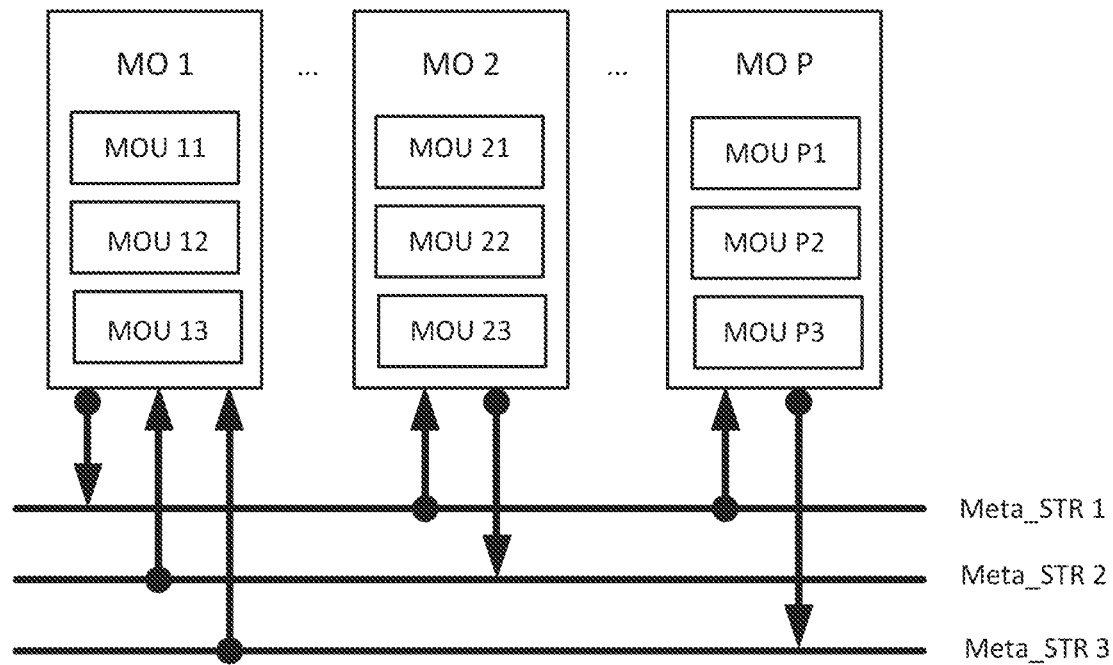
FIG. 14 shows a partitioning of a distributed event-discrete system according to the present invention, wherein the partitioning is defined as a set of subsystem clusters such that all subsystems assigned to a specific subsystem cluster are modeled with a same meta object type.

FIG. 14 shows a partitioning of a distributed event-discrete system according to the present invention, wherein the partitioning is defined as a set of subsystem clusters such that all subsystems assigned to a specific subsystem cluster are modeled with a same meta object type.

As outlined above, according to the present invention the different levels abstraction in the modelling of distributed event discrete systems—i.e., meta level, use level, and twin level—imply a partitioning of distributed event discrete systems into subsystems itself being composed of digital twins.

Assuming the notion of distributed event-discrete systems, related subsystems and streams between the subsystems a topic to be resolved for modelling of the distributed event-discrete system is how to partition the overall structure of the distributed event-discrete system into the at least one subsystem which may then be modeled using a related meta object type MO● as described above.

Heretofore, initially it must be determined which of the available meta object types MO● are indeed relevant for a particular case of partitioning of a distributed event-discrete system.

As shown in FIG. 14, according to the present invention meta object type based partitioning according to the meta object type MO● implies definition of subsystem clusters MOC={MO1, ..., MOp} such that each subsystem cluster MOi∈MOC comprises at least one subsystem being modelled with a same meta model type MO●.

In more detail, let MOT=(type1, ..., typet) be a set of all meta object types MO● available for modelling of a distributed event discrete system and the mapping MOT(MOi): MOi→type of MOi∈MOT be a function which maps a subsystem identification MOi to its related meta model type MO●.

Then meta object type based partitioning P(x)=G [SS, STR] (x) of the distributed event-discrete system means that different subsystems of a subsystem cluster have a same meta model type MO●, i.e, that for all MOi, MOj∈MOCk with i≠j, MOT(MOi)=MOT (MOj)=MO●.

Further, a partitioning of the distributed event-discrete system P(x) may be represented as a digraph according to P(x)=G [SS, STR] (x). In more detail, SS={SS1, ..., SSp} is a of subsystem clusters according to meta object types {MO1, ..., MOp} and STR={STR1, ..., STRq} is a set of streams between the subsystems of the distributed event-discrete system. Here, subsystem clusters have common language scope, semantics, and behavior of subsystems meta model, as well as a common set of meta data, features and characteristics.

Further, according to the present invention within each subsystem cluster reflecting a certain meta object type MO● there are introduced sub-clusters of subsystems according to different uses of the subsystems being modeled by the meta object type MO●.

Further, with respect to each subsystem cluster having meta model typei there are described different use scenarios of the underlying meta model typei which use scenarios are modelled as subsystem use clusters MOUCi= {MOUC1, ..., MOUCu}i.

An outcome of the meta object type based partitioning and clustering is that subsystems of the distributed event-discrete system are clustered according to related meta object type MO●.

Within each subsystem cluster optionally there are described different subsystem use clusters having a same meta object type MO● but different uses of the meta model type MO●.

Once a partitioning of the distributed event-discrete system is available a further point to be resolved for on the level of use level modeling is the setup of a routing topology for the exchange of streaming messages between subsystem clusters MOCi∈MOC.

As shown in FIG. 14, a routing topology is defined with respect to every subsystem cluster MOCi∈MOC. In more detail for every subsystem cluster MOCi there is defined a set MOC_rec_i of at least one subsystem cluster from which the subsystem cluster MOCi receives streaming messages. Also, for every subsystem cluster MOCi there is defined a set HOC_send_i of at least one subsystem cluster to which subsystem cluster MOCi sends streaming messages.

Then follows the setup of a routing topology between subsystem clusters of the distributed event-discrete system to proceed in the transition from the meta level modelling to the use level modelling.

Further, a final step in the use-level modeling process relates to a transfer of the use-level modeling result into an executable software skeleton. The executable software skeleton serves to run a digital twin engine for control of a distributed even-discrete system in real-time.

In conclusion, the meta object type based partitioning significantly lowers the amount of data to be streamed between different subsystem clusters compared to a modelling approach where compositional representation is achieved on the level of digital twin objects without abstraction of modelling to a meta domain and use level domain.

The reason for this that on the streaming between different subsystem clusters is realized as meta streaming. Here, for each subsystem cluster the related digital twin objects—sub-clustered according to meta model type use—broadcast data in relation to internal events of the subsystem cluster on a common streaming channel assigned to the subsystem cluster modelled with a specific meta object type MO●.

Otherwise, each other subsystem cluster receives data in relation to external events of a of a subsystem cluster of certain meta object type MO● on meta streaming channel assigned for the other meta model type.

Overall, the number of streaming channels is dependent only on the number of subsystem clusters and related meta object types MO● and not on the number of actual subsystems and related twin objects. This has a large influence on the complexity of the routing topology between subsystem clusters as the number of communication channels for a complete communication process within the distributed event-discrete system increases linearly with the number of meta object type MO● and not exponentially with the number of actual subsystems.

Further, it should be noted that subsystems itself may be decomposed into related further subsystems leading to introduction of hierarchy into the overall modelling process.

Figure 15:
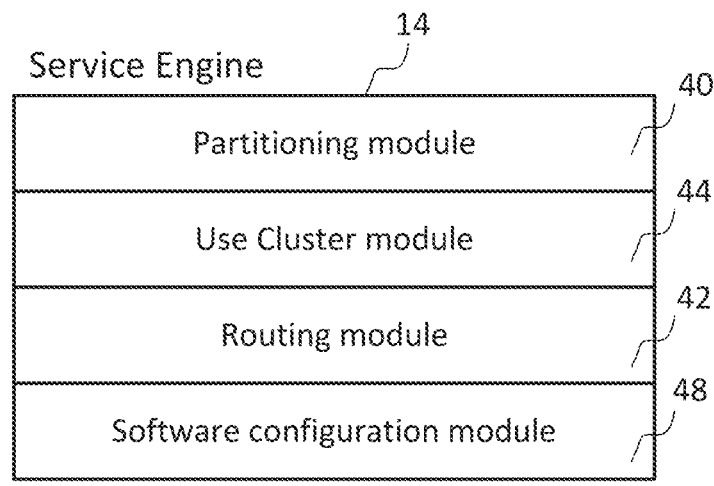
FIG. 15 shows a schematic diagram of a service engine according to the present invention, wherein the service engine generates a use model of at least one subsystem of a distributed event-discrete system in line with a meta object type used to model the at least one subsystem.

FIG. 15 shows a schematic diagram of the service engine 14 according to the present invention shown in FIG. 10, wherein the service engine 14 generates a use model of at least one subsystem of a distributed event-discrete system in line with a meta object type used to model the at least one subsystem.

As shown in FIG. 15, the service engine comprises a partitioning module 40 adapted to partition the distributed event-discrete system into at least two subsystem clusters each comprising at least one subsystem of the distributed event-discrete system as explained with respect to FIG. 14. Here, all subsystems assigned to a specific subsystem cluster MOCiϵMOC are modeled with a same meta object type MO●.

As shown in FIG. 15, the service engine comprises a routing module 42 adapted to define a routing topology for the exchange of streaming messages between subsystem clusters MOCiϵMOC.

As shown in FIG. 15, the service engine comprises a use cluster module 44 adapted to model different subsystem use clusters MOUCi={MOUC1, . . . , MOUCu}i for all subsystems assigned to a subsystem cluster of the distributed event-discrete system.

Preferably, the routing topology defines for every subsystem cluster MOCi at least one external subsystem cluster from streaming messages are received and at least one external subsystem cluster to streaming messages are sent.

As shown in FIG. 15, the service engine comprises a software configuration module 46 adapted to transform the use model of at least one subsystem of a distributed event-discrete system into at least one executable modeling software kernel that can run on a digital twin engine for real-time control of a distributed even-discrete system.

Preferably, the software configuration module 46 is adapted to:
configure the at least one executable modeling software kernel per system cluster MOCi through parametrization of executable software available from a software library; wherein
the at least one executable modeling software kernel is configured to run at least one subsystem use model in relation to every subsystem use of the subsystem cluster MOCi; and
the at least one executable modeling software kernel is configured to run an input interface and an output interface for exchange of at message streams having meta level message format to and from the at least one executable modeling software kernel.

Further, according to the present invention the software configuration module 46 is adapted to configure a routing topology between at least two executable modeling software kernels by connecting related input interfaces and output interfaces via at least one meta stream communication channel.

Further, according to the present invention the software configuration module 46 is adapted to load the at least one executable modeling software kernel into the digital twin engine for control of a distributed even-discrete system in real time.

Figure 16:
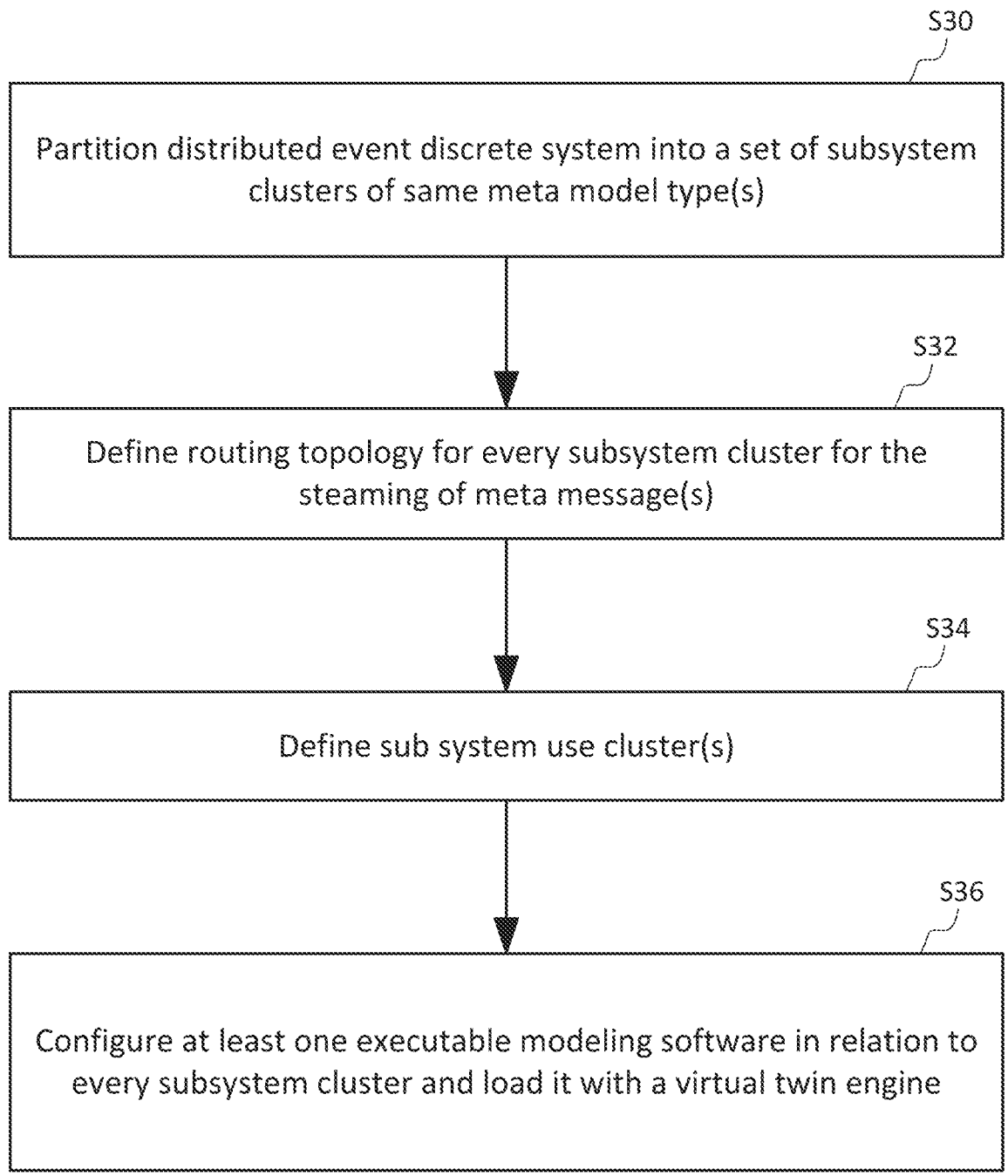
FIG. 16 shows a flowchart of operation for the use level modeling according to the present invention as shown in FIG. 14 and FIG. 15, respectively.

FIG. 16 shows a flowchart of operation for the use level modeling according to the present invention as shown in FIG. 14 and FIG. 15, respectively.

As shown in FIG. 16, to achieve use level modeling according to the present invention there is executed a step S30, by running the partitioning module 40 shown in FIG. 15, to partition the distributed event-discrete system into at least two subsystem clusters each comprising at least one subsystem of the distributed event-discrete system, wherein all subsystems assigned to a specific subsystem cluster MOCiϵMOC are modeled with a same meta object type MO●.

As shown in FIG. 16, subsequent to step S30 there is executed a step S32, by running the routing module 42 shown in FIG. 15, to define a routing topology for the exchange of streaming messages between subsystem clusters MOCiϵ MOC.

Preferably, step 32 defines a routing topology by defining for every subsystem cluster MOCi at least one external subsystem cluster from streaming messages are received and at least one external subsystem cluster to streaming messages are sent.

As shown in FIG. 16, subsequent to step S32 there is executed a step S34, by running the use cluster module 42 shown in FIG. 15, to define different subsystem use clusters MOUCi={MOUC1, . . . , MOUCu}i) for all subsystems assigned to a subsystem cluster of the distributed event-discrete system.

As shown in FIG. 16, subsequent to step S34 there is executed a step S36, by running the software configuration module 46 shown in FIG. 15, to configure software to transform the use model of at least one subsystem of a distributed event-discrete system into at least one executable modeling software kernel that can run on a digital twin engine for real-time control of a distributed even-discrete system.

The specifics of the software configuration according t to step S36 have been outlined above with respect to FIG. 15 and therefore will not be repeated here.

Finally, during execution of step S36 the at least one executable modeling software kernel is loaded into the virtual twin engine 16 for control of a distributed even-discrete system in real time.

While above different aspects of the present invention being related to the modeling of a distributed event-discrete system have been described in the following the of the generated model for real time process control of the distributed event-discrete system will be explained.

Figure 17:
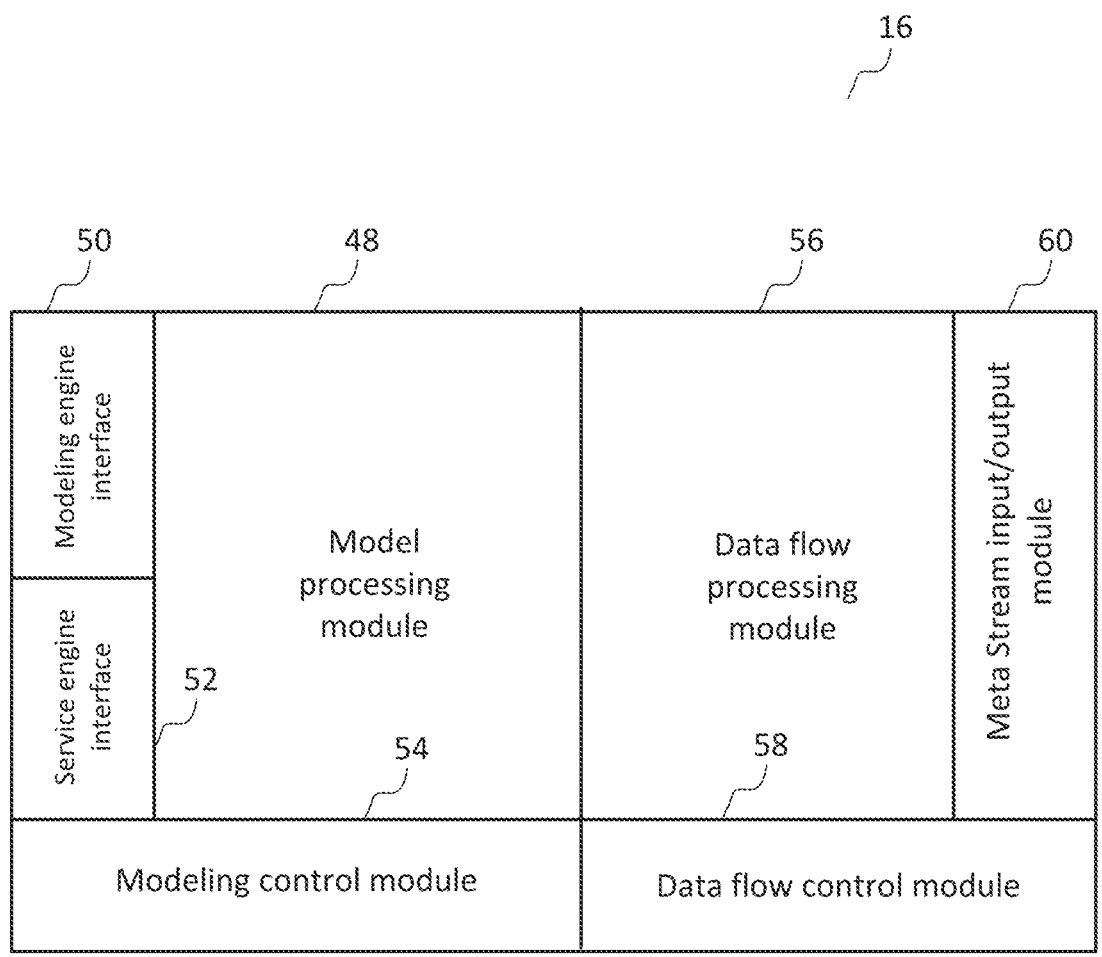
FIG. 17 shows a schematic diagram of a virtual twin engine according to the present invention, wherein the virtual twin engine has pre-installed at least one executable modeling software kernel prepared by the service engine as shown in FIG. 15.

FIG. 17 shows a schematic diagram of a virtual twin engine 16 according to the present invention.

In the following it will be assumed that the virtual twin engine 16 has pre-installed at least one executable modeling software kernel prepared by the service engine 15 as shown in FIG. 15.

As outlined above, this implies a pre-installation of at least one modeling software kernel per system cluster of the distributed even-discrete system and related meta object type MO● used for meta level modeling of the system cluster.

As shown in FIG. 17, the virtual twin engine 16 according to the present invention comprises a model processing module 48 adapted to run in real time at least one subsystem use model in relation to the subsystem cluster through execution of a related modeling software kernel modeling the at least one subsystem use model.

According to the present invention the model processing module 48 is adapted to operate at least one digital twin with respect to the at least one subsystem use model as virtual counterpart to a related process object operated in the distributed even-discrete system and having a functionality in line with the subsystem use model.

Further, according to the present invention the model processing module 48 is adapted to operate the at least one digital twin in a passive manner through real time access to the modeling software kernel modeling the subsystem use model of the at least one digital twin.

As shown in FIG. 17, the virtual twin engine 16 according to the present invention comprises a modeling engine interface 50 adapted to inject modeling information into the module processing module 48 by activating at least one meta object type MO● from all available meta object types MO● supported by the modeling engine into the digital twin engine.

Preferably, the modeling engine interface 50 is adapted to inject a set of state models $\Sigma_{ij}$, where i is the index to the state model and j is the index to the related use, representing the comprising at least state model representing the meta object type MO● into the module processing module 48.

Further preferably, the modeling engine interface 50 is adapted to inject at least one perspective $P_j$ on the injected at least one state model into the module processing module 48.

Further preferably, the modeling engine interface 50 is adapted to inject different levels of data abstraction according to meta data, target data, and actual data for each state model and related state variables into the module processing module 48.

Further preferably, the modeling engine interface 50 is adapted to inject at least one subsystem use cluster with a predetermined meta model type and at least one related digital twin. Here, the at least one digital twin serves as a digital counterpart to a corresponding real world process object.

As shown in FIG. 17, the virtual twin engine 16 according to the present invention comprises a service engine interface 52 adapted to inject software code implementing external and/or internal state transitions into the module processing module 48.

As shown in FIG. 17, the virtual twin engine 16 according to the present invention comprises a modeling control module 54 adapted to initialize at least one related digital twin in relation to at least one subsystem use cluster. Preferably, the modeling control module 54 is adapted to initialize the at least one digital twin prior to start of the digital twin engine or in real time during operation of the digital twin engine.

As shown in FIG. 17, the virtual twin engine 16 according to the present invention comprises a data flow processing module 56 adapted to handle the data exchange to/from the virtual twin engine.

As shown in FIG. 17, the virtual twin engine 16 according to the present invention comprises a data flow control module 58 adapted to the control data exchange to/from the virtual twin engine by classifying communication data according to different levels of abstraction into at least control data flow and/or use data flow as will be explained in more detail in the following.

As shown in FIG. 17, the virtual twin engine 16 according to the present invention comprises a meta stream input/output module 60 for exchange of meta stream messages to and from the virtual twin engine 16.

Figure 18:
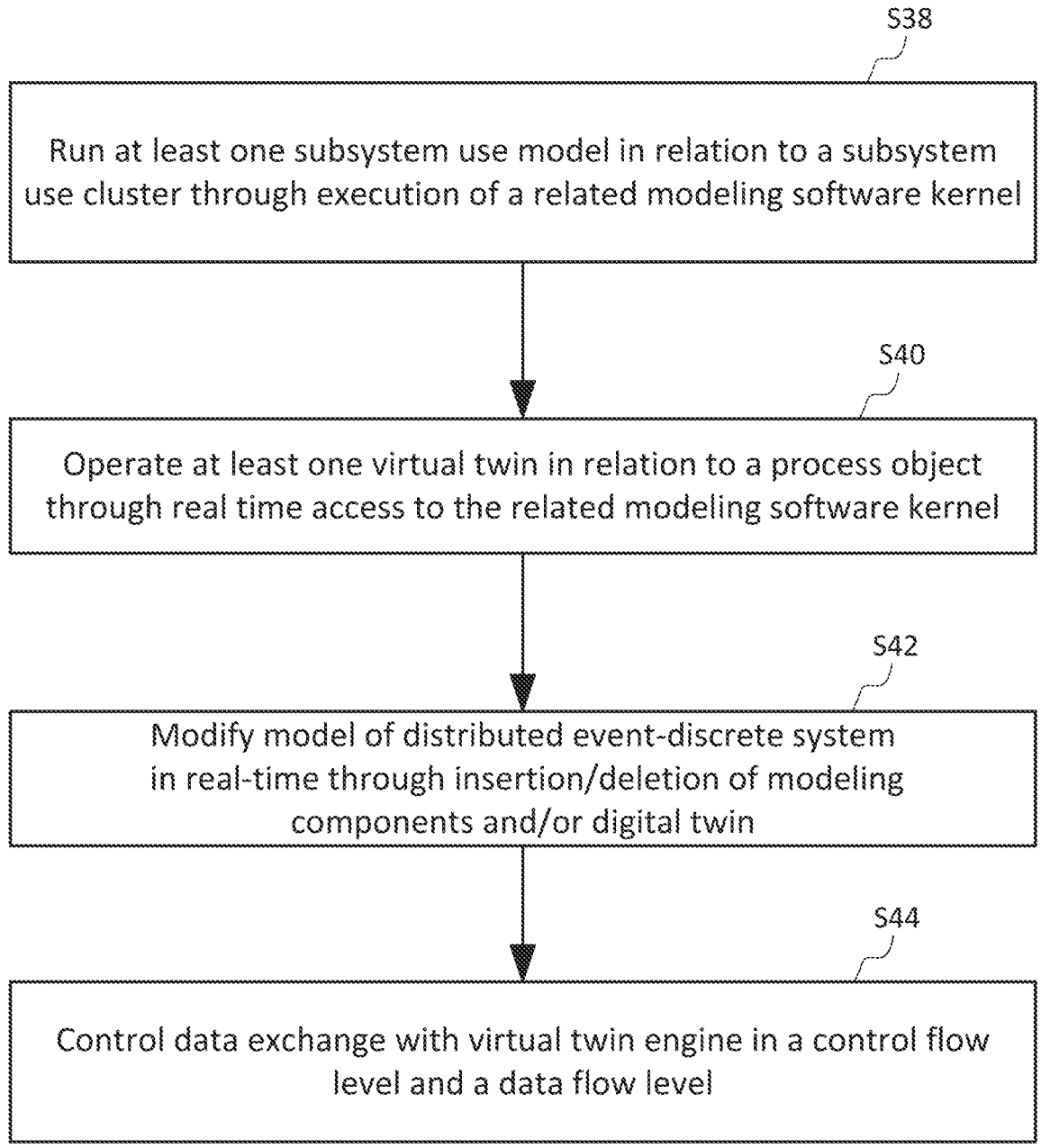
FIG. 18 shows a flowchart of operation for the virtual twin engine according to the present invention as shown in FIG. 17.

FIG. 18 shows a flowchart of operation for the virtual twin engine 16 according to the present invention as shown in FIG. 17.

As shown in FIG. 18, to achieve real time process control of a model distributed event-discrete system the is executed a step S38, by running the model processing use module 48, to run in real time at least one subsystem use model in relation to the subsystem cluster through execution of a related modeling software kernel modeling the at least one subsystem use model.

As shown in FIG. 18, to achieve real time process control of a model distributed event-discrete system the is executed a step S40, by running the model processing use module 48, to operate at least one digital twin with respect to the at least one subsystem use model as virtual counterpart to a related process object operated in the distributed even-discrete system and having a functionality in line with the subsystem use model.

According to the present invention the step S40 of operating the at least one digital twin is executed in a passive manner through real time access to the modeling software kernel modeling the subsystem use model of the at least one digital twin.

As shown in FIG. 18, to achieve real time process control of a model distributed event-discrete system there is executed a step S42, by running the model processing use module 48, to modify a model of the distributed event-discrete system in real time through insertion/deletion of modeling components and/or digital twins.

Preferably, the step S42 is executed to inject modeling information by activating at least one meta object type MO● from all available meta object types MO● supported by the modeling engine 12 into the module processing module 48 of the virtual twin engine 16.

Preferably, the step S42 is executed to inject at least state models $\Sigma_{ij}$ comprising at least state model representing the meta object type MO● into the module processing module 48 of the virtual twin engine 16.

Preferably, the step S42 is executed to inject at least one perspective $P_j$ on the injected at least one state model into the module processing module 48 of the virtual twin engine 16.

Preferably, the step S42 is executed to inject different levels of data abstraction according to meta data, target data, and actual data for each state model and related state variables into the data flow processing module 56 of twin engine 16.

Preferably, the step S42 is executed to inject software code implementing external and/or internal state transitions into the module processing module 48 of the virtual twin machine 16.

Preferably, the step S42 is executed to inject at least one subsystem use cluster with a predetermined meta object type into the module processing module 48 of the virtual twin machine 16.

As shown in FIG. 18, the step S42 is also executed initialize at least one digital twin in relation to a subsystem use cluster, wherein the at least one digital twin serves as a digital counterpart to a corresponding real world process object.

Preferably, the at least one digital twin is initialized prior to start of the virtual twin engine or during operation of the virtual twin engine for real time process control of the distributed event-discrete system.

As shown in FIG. 18, to achieve real time process control of a model distributed event-discrete system there is executed a step S44, by running the data flow control module 88, to control data exchange to/from the digital twin engine by classifying communication data according to different levels of abstraction into at least control data flow and/or use data flow.

Preferably, in step S44 there is evaluated at least one state vector representing at least one trigger event for at least one state transition of a digital twin.

Further preferably, in step S44 the control data flow is controlled by generating at least one meta stream message in relation to a state transition of a digital twin for exchange of related control data between different subsystem clusters.

Figure 19:
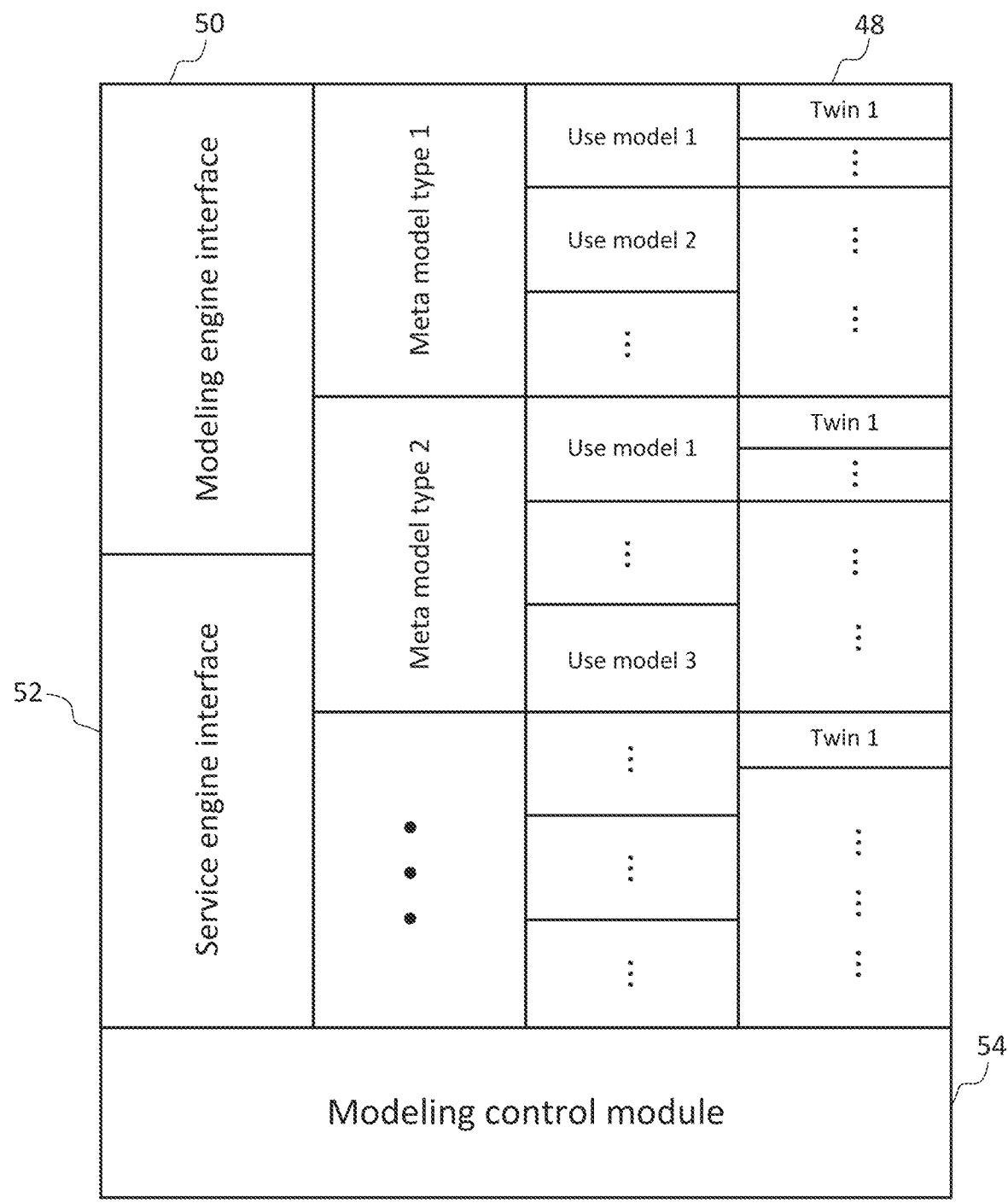
FIG. 19 shows further details of operation for a module processing module as operated in the virtual twin engine.

FIG. 19 shows further details of operation for the module processing module 48 as operated in the virtual twin engine 16.

As shown in FIG. 19, in the module processing unit 48 there run injected functional software code implementing specific meta model types and related use models thereof.

Then, for every subsystem use cluster in every subsystem cluster there is introduced at least one digital twin as digital counterpart in the digital domain of a real world process object in the process domain. To put it differently, each digital twin reflects the logical behavior of a process object in the domain to be modelled.

In more detail, for every subsystem use cluster MOUCk∈{MOUC1, . . . , MOUCu} of a subsystem cluster having meta model typei there is instantiated a set of at least one digital twin object TOk,i={to1, . . . , tol}k,i realizing a digital counterpart to a real world process object.

It should be noted that the introduction of digital twins may be executed either prior to start of the digital twin engine or during real time process control of the distributed event-discrete system. This is of significant importance as this real time configuration capability of the digital twin engine achieves a much higher flexibility and configurability in comparison to hard wired process control systems.

Further, as during initial configuration target values are not yet available so that they are declared according to type of data and a related memory is allocated, Similarly, also actual values are considered through declaration of data type and memory allocation.

The outcome of the initial configuration is a set of executable software kernels in relation to subsystem use clusters.

Subsequent thereto running the virtual twin engine implies running subsystem use models in relation to subsystem uses of subsystem clusters in real time through execution of the modeling software kernel modeling the subsystem use.

Further, at least one digital twin is operated with respect to every subsystem use model as digital counterpart and in one-to-one relation to at least one process object which is operated in the distributed even-discrete system and which has a functionality modeled by the digital twin.

In particular the at least one at least one digital twin is operated through real time access to the related modeling software kernel running in real time. Thus, the behavior of a twin object is not explicitly modelled but is inherited from the use level modelling stage.

Also, according to the present invention it is possible to trade off the size of subsystem use clusters and the number of twins. In a first case, the size of each use cluster is one and the subsystem use clusters cover exactly one twin object. This is referred to as explicit modelling. Alternatively a subsystem use cluster may cover more than one twin objects according to a 1:N relationship. This is referred to as implicit modelling.

Figure 20:
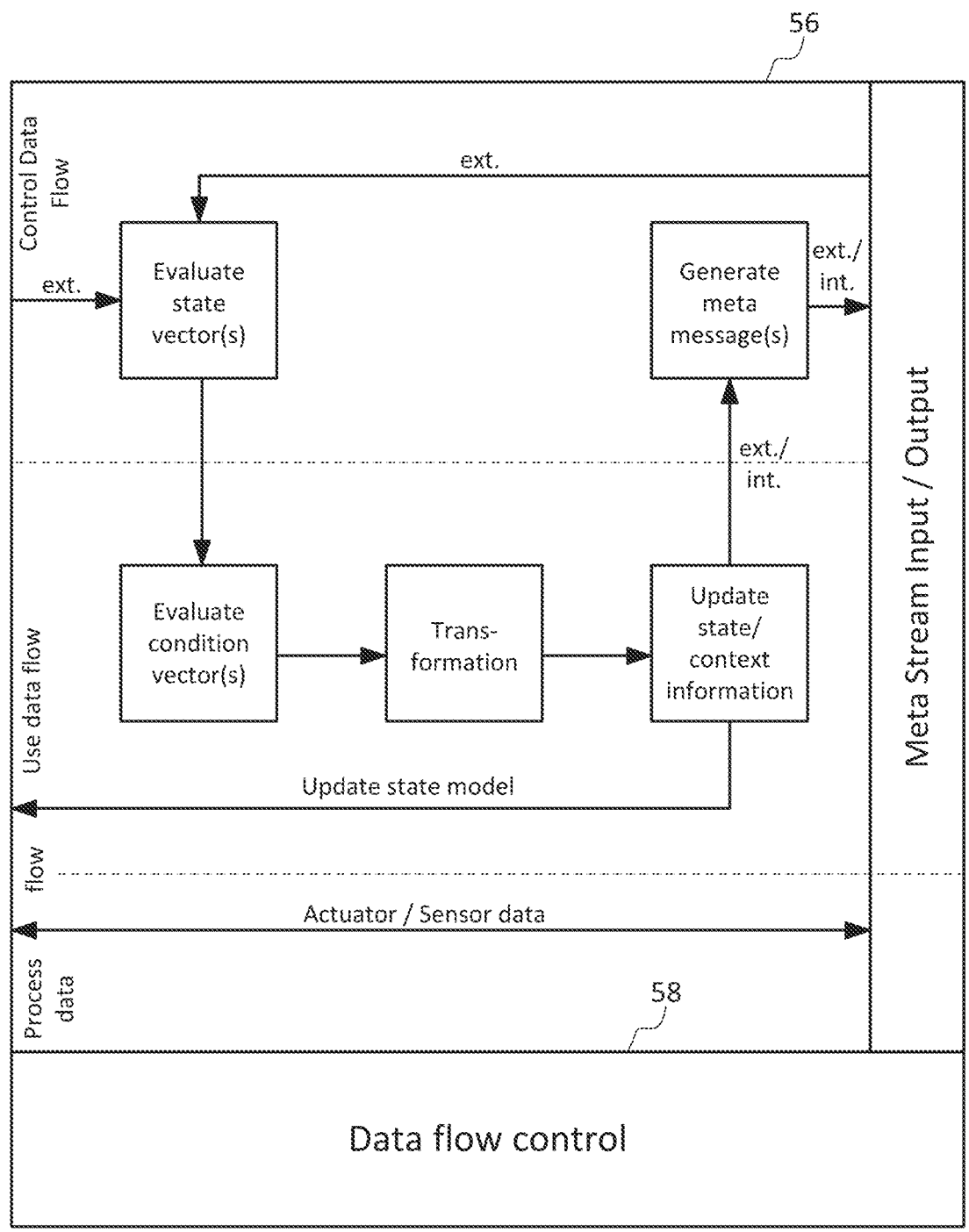
FIG. 20 shows a further schematic diagram illustrating the operation of the virtual twin engine according to the present invention.

FIG. 20 shows a further detailed schematic diagram illustrating the operation of the virtual twin engine 16 according to the present invention as shown in FIG. 17.

As shown in FIG. 20, another aspect of running the virtual twin engine 16 according to the present invention relates to the data flow control with respect to the exchange of data to and from the virtual twin engine 16.

As shown in FIG. 20, according to the present invention the control of data flow relies on dividing the data in different classes, e.g., control data flow, use-level data flow in relation to the real-time executing of the meta model type(s), use model type(s) and related twin object(s). A further category of data may be related to process data, e.g., sensor/actuator data fed into and/or output by the digital twin engine.

It should be noted that according to the present invention the use-level data flow may be used to influence the control data flow. Also, the use-level data flow may be specified on the use level of modeling and may be evaluated on the twin level of modeling. Finally, state transition related operative conditions are specifiable as use level conditions or meta level conditions.

In view of the above, the separation between control data and model-related data according to the present invention is in line with the computer-implemented meta model outlined above and allows to achieve a significant efficiency increase during operation of the overall system.

As shown in FIG. 20, a first element of control data related data flow control relates to the evaluation of external and/or internal state vectors representing triggering events for state transitions in the use models which model the operation of the digital twins.

As shown in FIG. 20, a second element of control data related data flow control relates to the generation of meta stream messages for exchange with subsystem clusters not being identical with the subsystem cluster where a state transition under consideration occurs.

As shown in FIG. 20, a first element of model-related data flow control relates to the evaluation of condition vectors representing conditions for state transitions in the use models which model the operation of the digital twins. In more detail, such conditions are evaluated in consideration of data representing actual or target values and in association with different states of the use-level state model operated in relation to digital twins.

As shown in FIG. 20 and assuming that conditions for a particular state transition are met, a second element of model-related data flow control relates to achievement of the actual transition from the initial state to the target state. This implies application of the associated transformation function to data representing the initial state for generation of data representing the target state. Also, a transition from the initial state to the target state necessitates at least one update of context information in correspondence to the twin object for which the state transition is handled.

As shown in FIG. 20, a third element of model-related data flow control relates the processing of the state transition result(s). Here, information related to the target state is submitted to the second element of control data flow control, i.e. the generation of meta stream messages.

Once a state transition is terminated there is generated a related meta stream message to inform other subsystem clusters with different meta model type about the state transition.

Further, once a state transition is terminated it is also necessary to update the related state space model representation within the subsystem cluster where the related state space model is run.

As indicated above, a further category of data may be related to process data, e.g., sensor/actuator data fed into and/or output by the digital twin engine. Here, related data is exchanged in real time between the twin object representations and sensor/actuator interfaces of the digital twin engine.

Figure 21:
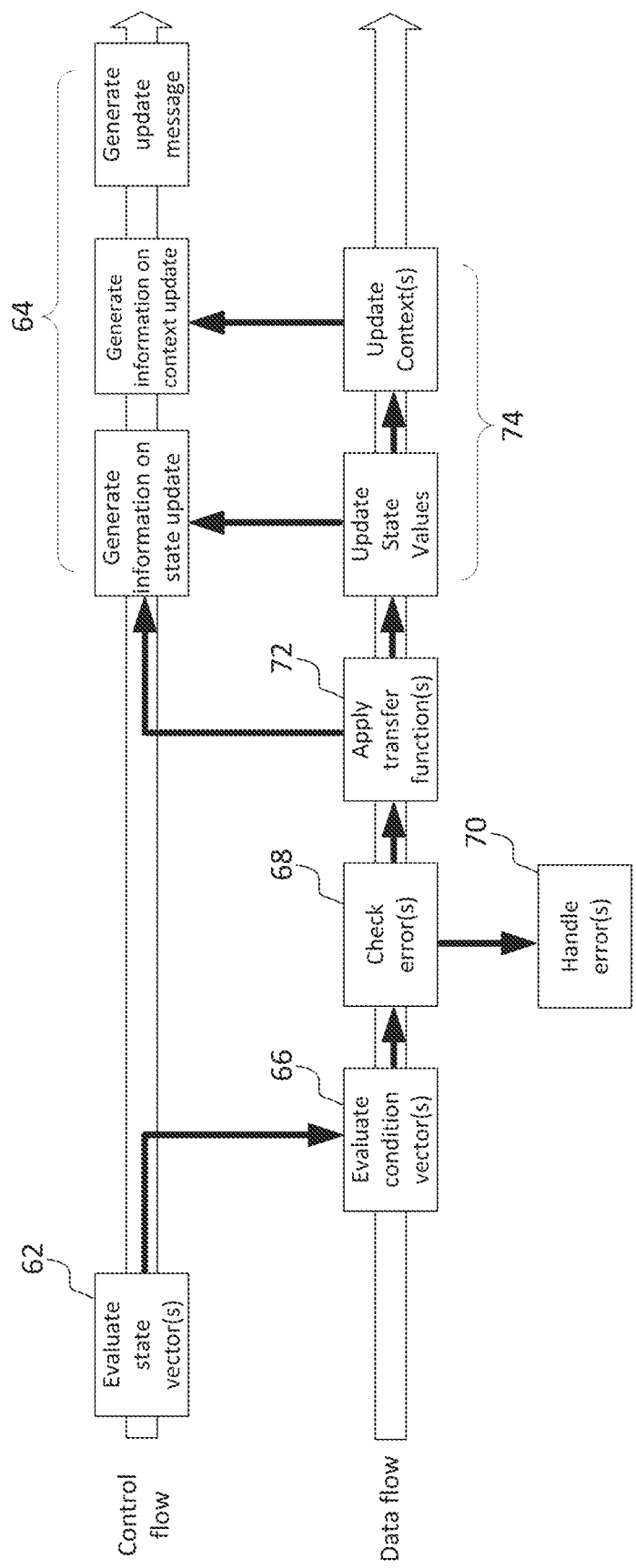
FIG. 21 shows a further detail flowchart of operation for the data flow processing module shown in FIGS. 17 and 20, respectively.

FIG. 21 shows a further detail flowchart of operation for the data flow processing module shown in FIGS. 17 and 20, respectively.

As shown in FIG. 21, according to the present invention the data flow control module 52 is adapted to control a state vector evaluation module 62 operating on the control data flow to evaluate at least one state vector representing at least one trigger event for at least one state transition of a digital twin.

As shown in FIG. 21, the data flow control module 58 is adapted to control a message generation module 64 operating on the control data flow to generate at least one meta stream message in relation to a state transition of a digital twin for exchange of related control data between different subsystem clusters.

As shown in FIG. 21, the data flow control module 58 is adapted to control a condition vector evaluation module 66 operating on the use data flow to evaluate at least one condition vector comprising at least an actual value and/or at least one target value in association with the at least one state transition of the at least one digital twin for evaluation of a related transition condition.

As shown in FIG. 21, the data flow control module 58 is adapted to control an error evaluation module 68 operating on the use data flow to evaluate at least one condition indication to an error in the operation in the virtual twin engine 16. If an error occurs, then an error handling module 70 will either fix the problem so that the operation may be resumed or terminate the overall operation of the virtual twin engine 16.

As shown in FIG. 21, the data flow control module 58 is adapted to control a transformation module 72 operating on the use data flow to apply at least one transformation function to data representing an initial state prior to a state transition to generate data representing a target state after the state transition.

As shown in FIG. 21, the data flow control module 58 is adapted to control an update module 74 operating on the use data flow to update state representation related information and optionally context information in relation to a state transition.

In conclusion, according to the present invention there is proposed a split of data flow into control data flow and use data flow. This reduces the complexity in communication and to improve a real time capability as operations on control data flow and use data flow can, e.g., be parallelized. Also it enables increase in flexibility as use data may have an impact on the control flow.

FIG. 22 shows an example of a seed-box approach used for evaluation of state vectors and condition vectors in the data flow processing module according to the present invention as shown in FIG. 17.

As outlined above, according to the present invention there are considered external state vectors triggering a state transition in a state space model upon occurrence of an event being external to the subsystem cluster wherein the state model is used.

As outlined above, an 1-th external state vector $\Theta ex,i \bullet at$, $l=((MOj, j\neq\bullet, zj), \ldots, (MOk, k\neq\bullet, zk))T1$ respectively summarizes tuples of subsystems external to a subsystem being modeled using the meta objet type $MO\bullet$ and corresponding states in which the external subsystems indicated to prevail. Also, it was explained above that for different state transitions a plurality of external state vectors may exit.

According to the present invention one may assume without loss of generality that different external state vectors per state transition are established in relation to different contexts.

Also according to the present invention meta models are prepared as basis for set-up of use-level models. Then for each dedicated use of a specific meta model there is instantiated at least one digital twin as digital counter part of a process object in the real world.

Form the above it should be clear that external state vectors as specified on the meta level are replicated according to a number of related digital twins and related different contexts accompanying a state transition of the digital twins.

Also, for each use model being operated in the virtual twin engine there is operated a at least one related state space model. Assuming that for each use model there is instantiated at least one digital twin then for every state in the related state space model there is considered at least one use of state per twin or equivalently state use per digital twin.

To put it differently, assuming that for a particular use model a plurality of twins are instantiated then for each state of the related state space model on the use level of abstraction there will be considered a corresponding plurality of state uses on the twin level of abstraction.

From the above and as shown in FIG. 22, the conclusion is that for every set of external state vectors per subsystem type and a related subsystem type use may be organized into a matrix form where rows correspond to the state uses with respect to digital twins of the subsystem use model and columns represent different context(s) for state transitions considered on the twin level of model abstraction.

Figure 23:
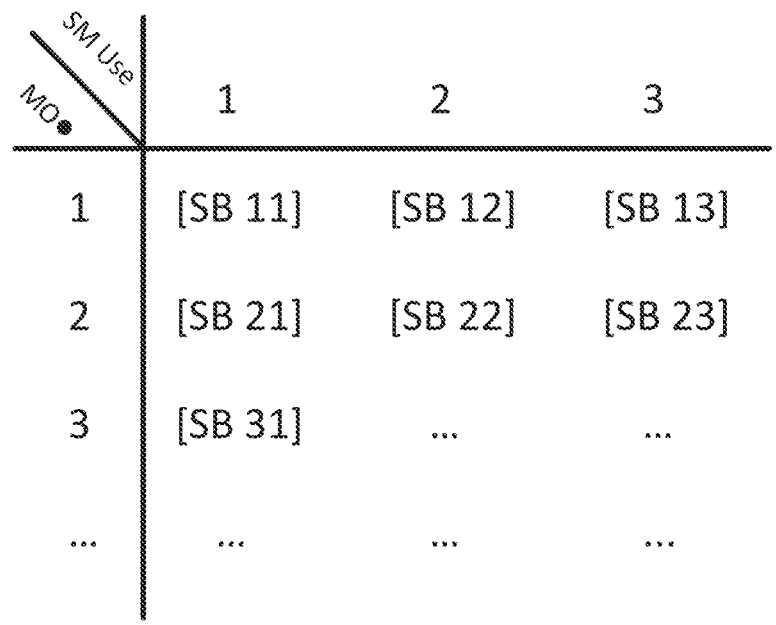
FIG. 23 shows a further example of the seed-box approach to the evaluation of state vectors and condition vectors in the data flow processing module according to the present invention as shown in FIG. 17.

FIG. 23 shows a further example of a seed-box approach for evaluation of state vectors and condition vectors in the data flow processing module according to the present invention as shown in FIG. 17.

As shown in FIG. 23, according to the present invention seed-boxes are prepared for every subsystem cluster of the use-level model of a distributed event-discrete system.

According to the present invention the preparation of the seed boxes is in line with the routing topology on the use-level abstraction of modeling.

In more detail and as shown in FIG. 23, for every subsystem cluster there will be prepared a seed box in relation to every other subsystem cluster to which the considered subsystem cluster listens. Further, there will be prepared a seed box in relation to in relation to each meta object type which is applicable in the other subsystem cluster to which the considered subsystem cluster listens. Finally, seed boxes will also be prepared for the handling of internal state transitions of state space models which are operated internally within a subsystem cluster.

Figure 24:
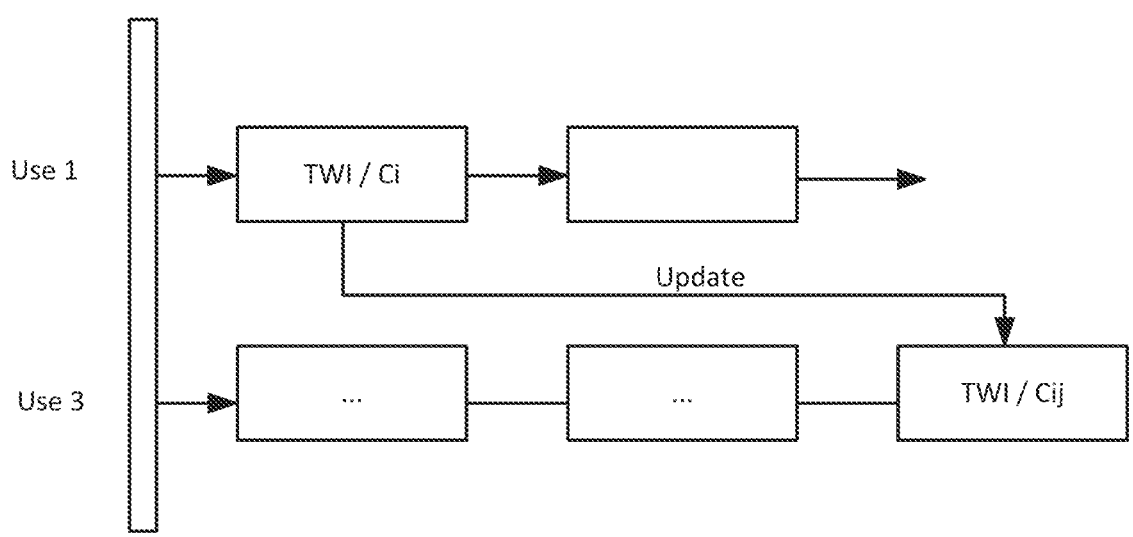
FIG. 24 shows an example of updating a seed-box as shown in FIGS. 22 and 23 after execution of a state transition with respect to a twin object.

FIG. 24 shows an example of updating a seed-box as shown in FIGS. 22 and 23 after execution of a state transition with respect to a twin object.

As is shown in FIG. 24, an efficient way to represent a matrix of state uses versus contexts as shown in FIG. 22 in a sparse manner is to use a linked list of twin/context pairs with respect to every state use. Then, once a twin executes a state transition this implies the cancelation of the related twin/context pair from a first list in relation to the source state of the state transition and the addition of an updated twin/context pair to a second list in relation to the target state of the state transition.

While in the above, the present invention has been described with reference to the drawings and figures of preferred embodiments of the invention, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

Glossary

Vectors and Sets:
x=(x1, ..., xk) T input vector
X set of input vectors
y=(y1, ..., yn) T output vector
Y set of output vectors
z=(z1, ..., zm) T state variable vector
Z set of state variable vectors
SS={SS1, ..., SSp} set of mutually disjoint subsystems of a distributed event discrete system
STR={STR1, ..., STRq} set of streams between subsystems of a distributed event discrete system
MOC={MOC1, ..., MOCp} set of subsystem clusters describing a partitioning of a distributed event discrete system
MOC_rec_i set of at least one subsystem cluster from which the subsystem cluster MOCi receives streaming messages
MOC_send_i set of at least one subsystem cluster to which subsystem cluster MOCi sends streaming messages
MOT={MOT1, ..., MOTp} set of meta object types available for modeling of a distributed event-discrete system
MOUCi={MOUC1, ..., MOUCui}i subsystem use clusters of subsystems within a subsystem being modelled with a specific meta object type typei
MO●R representation object of meta object type MO●
D●={d1, ..., do} set of descriptive features of the meta object type MO●
External state vector for meta object type MO●: Θex,i●at, l=((SSTj, j≠●, zj), ..., (SSTk, k≠●, zk))lT
πex,i●at=Ul Θex,i●at,l set of all external state vectors triggering a state transition due to an external event being relevant for meta object type MOT●
Δex,i● a set of conditions that must be met prior to triggering a state transition due to an external event being relevant for meta object type MOT●
πin,i●at set of internal state vectors triggering a state transition due to an internal event being relevant for meta object type MOT●
Δin,i● a set of conditions that must be met prior to triggering a state transition due to an internal event being relevant for meta object type MOT●
C=(con_ID1, ..., con_IDn) set of contexts
Functions:
Φ state transition function
Φin state transitions due to internal events
Φex state transitions due to external events
Ω output function
τ retention time function
Operators and Models:
S system operator
Σ=<X, Z, Y, Φin, Φx, Ω, τ> state model of a distributed event-discrete system
P(x)=G [SS, STR](x) digraph representation of a compositional partition of a distributed event-discrete system
Σi● i-th state model used in the static data model of partial subsystem TS●
● placeholder for an arbitrary but fixed element

The invention claimed is:

1. A method of running a virtual twin engine, executed by a computer, for control of a distributed event-discrete system in real-time, wherein the virtual twin engine has installed at least one executable modeling software kernel which is prepared by:
   generating a meta model representation for at least one subsystem of a distributed event-discrete system by selecting from a meta model a meta object type (MO●) referencing at least one state model ($\Sigma i\bullet i\epsilon\{1, \ldots, s\}$) for modeling of the at least one subsystem of the distributed event-discrete system, wherein at least one state (zi●k) in the at least one state model ($\Sigma i\bullet i\epsilon\{1, \ldots, s\}$) is described with a meta model comprising a set of partial states (zi●k,p) using different levels of data abstraction according to set of meta features characterizing a state in a meta description domain, a set of target features having discrete or continuous range of values characterizing a target for a considered state, and a set of actual features having discrete or continuous range of values characterizing an actual constellation of a considered state;
   partitioning the distributed event-discrete system into at least two subsystem clusters each comprising at least one subsystem of the distributed event-discrete system having a same meta model representation;
   defining a routing topology for exchange of streaming messages between subsystem clusters;

modeling at least one subsystem use cluster for at least one subsystem assigned to a subsystem cluster of the distributed event-discrete system; and configuring the at least one executable modeling software kernel to run the routing topology and at least one subsystem use model in relation to every subsystem use of the subsystem cluster through parametrization of executable software available from a software library, the method of running the virtual twin engine comprising:

running in real time at least one subsystem use model in relation to the subsystem cluster through execution of a related modeling software kernel modeling the at least one subsystem use model; and operating at least one digital twin with respect to the at least one subsystem use model as a virtual counterpart to a related process object operated in the distributed event-discrete system and having a functionality corresponding to the at least one subsystem use model, wherein the operating of the at least one digital twin is executed in a passive manner through real time access to the modeling software kernel modeling the at least one subsystem use model of the at least one digital twin.

2. The method according to claim 1, further comprising:
injecting at least one element into the virtual twin engine, the at least one element being selected from a group comprising:
   modeling information reflecting at least one meta object type (MO●);
   a set of state models ($\Sigma ij$) comprising at least one state model referenced by the meta object type (MO●);
   at least one perspective representing a view on the at least one state model;
   different levels of data abstraction according to meta data, target data, and actual data for each state model and related state variables;
   software code implementing external and/or internal state transitions; and
   at least one subsystem use cluster with a predetermined meta model type.

3. A method according to claim 1, further comprising:
initializing at least one digital twin in relation to a subsystem use cluster, wherein the at least one digital twin serves as a digital counterpart to a corresponding real world process object.

4. The method according to claim 3, wherein the initializing of at least one digital twin is executed prior to start of the virtual twin engine or during operation of the virtual twin engine for real time process control of the distributed event-discrete system.

5. The method according to claim 1, further comprising:
controlling data exchange to/from the virtual twin engine by classifying communication data according to different levels of abstraction into at least control data flow and/or use data flow.

6. The method according to claim 5, further comprising:
controlling the control data flow by evaluating at least one state vector representing at least one trigger event for at least one state transition of a digital twin.

7. The method according to claim 5, further comprising:
controlling the control data flow by generating at least one meta stream message in relation to a state transition of a digital twin for exchange of related control data between different subsystem clusters.

8. The method according to claim 5, further comprising:
controlling the use data flow by evaluating at least one condition vector comprising at least an actual value and/or at least one target value in association with at least one state transition of the at least one digital twin for evaluation of a related transition condition.

9. The method according to claim 5, further comprising:
controlling the use data flow by executing at least one step selected from a group of steps comprising:
   applying at least one transformation function to data representing an initial state prior to a state transition to generate data representing a target state after the state transition;
   updating at least one context information in relation to a state transition; and
   processing of a state transition result for generation of at least one meta stream message for update of at least one state model in a subsystem use cluster external to a subsystem use cluster of a digital twin executing the state transition.

10. A system for executing a virtual twin engine for control of a distributed event-discrete system in real-time, comprising:
a programmed computer configured to execute:
   at least one executable modeling software kernel configured to:
      generate a meta model representation for at least one subsystem of a distributed event-discrete system by selecting from a meta model a meta object type (MO●) referencing at least one state model ($\Sigma i \bullet i \epsilon \{1, \ldots, s\}$) for modeling of the at least one subsystem of the distributed event-discrete system, wherein at least one state ($zi \bullet k$) in the at least one state model ($\Sigma i \bullet i \epsilon \{1, \ldots, s\}$) is described with a meta model comprising a set of partial states ($zi \bullet k, p$) using different levels of data abstraction according to set of meta features characterizing a state in a meta description domain, a set of target features having discrete values or a continuous range of values characterizing a target for a considered state, and a set of actual features having discrete or continuous range of values characterizing an actual constellation of a considered state,
      partition the distributed event-discrete system into at least two subsystem clusters each comprising at least one subsystem of the distributed event-discrete system having a same meta model representation,
      define a routing topology for exchange of streaming messages between subsystem clusters,
      model at least one subsystem use cluster for at least one subsystem assigned to a subsystem cluster of the distributed event-discrete system, and
      configure the at least one executable modeling software kernel to run the routing topology and at least one subsystem use model in relation to every subsystem use of the subsystem cluster through parametrization of executable software available from a software library; and
   a model processing module adapted to:
      run in real time at least one subsystem use model in relation to the subsystem cluster through execution of a related modeling software kernel modeling the at least one subsystem use model, and
      operate at least one digital twin with respect to the at least one subsystem use model as a virtual counterpart to a related process object operated in the distributed event-discrete system and having a functionality corresponding to the at least one subsystem use model, wherein the model processing module operates the at least one digital twin in a passive manner through real time access to the modeling software kernel modeling the at least one subsystem use model of the at least one digital twin.

11. The system according to claim 10, wherein the programmed computer is further configured to provide:
a modeling engine interface adapted to inject at least one element into the virtual twin engine, the at least one element being selected from a group comprising:
modeling information reflecting at least one meta object type (MO●);
a set of state models ($\Sigma ij$) comprising at least one state model referenced by the meta object type (MO●);
at least one perspective representing a view on the at least one state model;
different levels of data abstraction according to meta data, target data, and actual data for each state model and related state variables;
software code implementing external and/or internal state transitions; and
at least one subsystem use cluster with a predetermined meta model type.

12. The system according to claim 10, wherein the programmed computer is further configured to execute:
a modeling control module adapted to inject at least one digital twin in relation to a subsystem use cluster, wherein the at least one digital twin serves as a digital counterpart to a corresponding real world process object.

13. The system according to claim 12, wherein the modeling control module is adapted to initialize the at least one digital twin prior to start of the virtual twin engine or in real time during operation of the virtual twin engine.

14. The system according to claim 10, wherein the programmed computer is further configured to provide:
a service engine interface adapted to inject software code implementing external and/or internal state transitions into the virtual twin engine.

15. The system according to claim 10, wherein the programmed computer is further configured to execute:
a data flow control module adapted to control data exchange to/from the virtual twin engine by classifying communication data according to different levels of abstraction into at least control data flow and/or use data flow.

16. The system according to claim 15, wherein the data flow control module is adapted to control a state vector evaluation module operating on the control data flow to evaluate at least one state vector representing at least one trigger event for at least one state transition of a digital twin.

17. The system according to claim 15, wherein the data flow control module is adapted to control a state vector evaluation module operating on the control data flow to generate at least one meta stream message in relation to a state transition of a digital twin for exchange of related control data between different subsystem clusters.

18. The system according to claim 15, wherein the data flow control module is adapted to control a condition vector evaluation module operating on the use data flow to evaluate at least one condition vector comprising at least an actual value and/or at least one target value in association with at least one state transition of the at least one digital twin for evaluation of a related transition condition.

19. The system according to claim 15, wherein the data flow control module is adapted to control a transformation module operating on the use data flow to apply at least one transformation function to data representing an initial state prior to a state transition to generate data representing a target state after the state transition.

20. The system according to claim 15, wherein the data flow control module is adapted to control an update module operating on the use data flow to update at least one context information in relation to a state transition.

21. The system according to claim 15, wherein the data flow control module is adapted to control a message generation module operating on the control data flow to generate at least one meta stream message for update of at least one state model in a subsystem use cluster external to a subsystem use cluster of a digital twin executing a state transition.

* * * * *